(12) United States Patent
Nakagawa et al.

(10) Patent No.: US 10,697,383 B2
(45) Date of Patent: Jun. 30, 2020

(54) ENGINE CONTROL DEVICE

(71) Applicant: Hitachi Automotive Systems, Ltd., Hitachinaka-shi, Ibaraki (JP)

(72) Inventors: Shinji Nakagawa, Tokyo (JP); Toshio Hori, Hitachinaka (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 202 days.

(21) Appl. No.: 15/520,178

(22) PCT Filed: Sep. 4, 2015

(86) PCT No.: PCT/JP2015/075148
§ 371 (c)(1),
(2) Date: Apr. 19, 2017

(87) PCT Pub. No.: WO2016/063639
PCT Pub. Date: Apr. 28, 2016

(65) Prior Publication Data
US 2017/0314482 A1    Nov. 2, 2017

(30) Foreign Application Priority Data

Oct. 24, 2014  (JP) ................................ 2014-216812

(51) Int. Cl.
*F02D 41/00* (2006.01)
*F02P 9/00* (2006.01)
(Continued)

(52) U.S. Cl.
CPC ....... *F02D 41/0052* (2013.01); *F02D 19/024* (2013.01); *F02D 19/10* (2013.01);
(Continued)

(58) Field of Classification Search
CPC ............. F02D 41/0052; F02D 41/1456; F02D 19/024; F02D 41/0072; F02D 19/10;
(Continued)

(56) References Cited

U.S. PATENT DOCUMENTS 5,887,570 A   3/1999  Suzuki et al.
8,573,184 B2  11/2013 Nakagawa et al.
(Continued)

FOREIGN PATENT DOCUMENTS

CN    1580528 A   2/2005
CN    1936307 A   3/2007
(Continued)

OTHER PUBLICATIONS

Chinese-language Office Action issued in counterpart Chinese Application No. 201880057298.2 dated Mar. 29, 2018 (seven (7) pages).
(Continued)

*Primary Examiner* — Joseph J Dallo
*Assistant Examiner* — Scott A Reinbold
(74) *Attorney, Agent, or Firm* — Crowell & Moring LLP

(57) ABSTRACT

The present invention suppresses the worsening of stability due to a variation in EGR amounts between cylinders in a spark ignition engine. An engine control device for controlling a spark ignition engine equipped with an EGR means for recirculating exhaust gas in a combustion chamber and an air-fuel-ratio detection means for detecting the air-fuel ratio in each cylinder, the engine control device being characterized by being equipped with a means for changing the parameters for ignition control of a rich cylinder, when the air-fuel ratio of cylinders varies and there are richer cylinders and leaner cylinders relative to a prescribed air-fuel ratio during the execution of exhaust gas recirculation by the EGR means.

9 Claims, 19 Drawing Sheets

(51) Int. Cl.

| | | |
|---|---|---|
| *F02D 41/14* | (2006.01) | |
| *F02P 5/15* | (2006.01) | |
| *F02D 37/02* | (2006.01) | |
| *F02D 43/00* | (2006.01) | |
| *F02D 19/02* | (2006.01) | |
| *F02D 19/10* | (2006.01) | |
| *F02D 41/28* | (2006.01) | |
| *F02P 3/045* | (2006.01) | |
| *F02P 5/152* | (2006.01) | |
| *F02D 21/08* | (2006.01) | |

(52) U.S. Cl.
CPC ......... *F02D 37/02* (2013.01); *F02D 41/0072* (2013.01); *F02D 41/1456* (2013.01); *F02D 41/1498* (2013.01); *F02D 43/00* (2013.01); *F02P 5/15* (2013.01); *F02P 5/1516* (2013.01); *F02P 9/002* (2013.01); *F02D 41/006* (2013.01); *F02D 2021/083* (2013.01); *F02D 2041/288* (2013.01); *F02P 3/045* (2013.01); *F02P 5/1522* (2013.01); *Y02T 10/46* (2013.01); *Y02T 10/47* (2013.01)

(58) Field of Classification Search
CPC ...... F02D 37/02; F02D 41/1498; F02D 43/00; F02D 2041/288; F02D 41/006; F02D 2021/083; F02D 41/0077; F02P 5/1516; F02P 9/002; F02P 5/15; F02P 3/045; F02P 5/1522; Y02T 10/46; Y02T 10/47; F02M 26/52; F02M 26/57
USPC .................................... 123/568.26
See application file for complete search history.

(56) References Cited

U.S. PATENT DOCUMENTS

| | | | |
|---|---|---|---|
| 2003/0221664 A1* | 12/2003 | Surnilla | ................. F02D 17/02 123/339.11 |
| 2004/0144079 A1 | 7/2004 | Nagai et al. | |
| 2005/0022517 A1 | 2/2005 | Miura | |
| 2011/0029218 A1* | 2/2011 | Nakagawa | .......... F02D 41/0085 701/103 |
| 2011/0100327 A1* | 5/2011 | Nakagawa | .......... F02D 13/0226 123/445 |
| 2013/0179051 A1 | 7/2013 | Tomimatsu et al. | |
| 2014/0298777 A1 | 10/2014 | Koga | |
| 2014/0338636 A1 | 11/2014 | Irie et al. | |

FOREIGN PATENT DOCUMENTS

| | | |
|---|---|---|
| CN | 102052173 A | 5/2011 |
| CN | 102575602 A | 7/2012 |
| CN | 104011356 A | 8/2014 |
| CN | 104024608 A | 9/2014 |
| EP | 2 594 771 A1 | 5/2013 |
| JP | 10-73068 A | 3/1998 |
| JP | 2004-204704 A | 7/2004 |
| JP | 2006-161691 A | 6/2006 |
| JP | 2008-215298 A | 9/2008 |
| JP | 2010-242630 A | 10/2010 |
| JP | 2012-117463 A | 6/2012 |

OTHER PUBLICATIONS

International Search Report (PCT/ISA/210) issued in PCT Application No. PCT/JP2015/075148 dated Nov. 17, 2015 with English translation (three pages).

Japanese-language Written Opinion (PCT/ISA/237) issued in PCT Application No. PCT/JP2015/075148 dated Nov. 17, 2015 (three pages).

Extended European Search Report issued in counterpart European Application No. 15853028.7 dated Jun. 20, 2018 (seven pages).

* cited by examiner

PROCESS PERIOD: 10deg

< RICH CYLINDER DETECTION UNIT >

PROCESS PERIOD: 10ms

<CONDUCTION TIME CALCULATION UNIT>

PROCESS PERIOD: EVERY COMBUSTION (EVERY 180degCA)

<TWO-ROTATIONAL COMPONENT CALCULATION UNIT>

PROCESS PERIOD: EVERY COMBUSTION (EVERY 180degCA)

⟨RICH CYLINDER DETECTION UNIT⟩

PROCESS PERIOD:
EVERY COMBUSTION
(EVERY 180degCA)

⟨INDIVIDUAL-CYLINDER ROTATIONAL VARIATION CALCULATION UNIT⟩

<UNSTABLE CYLINDER DETECTION UNIT>

<EXCESSIVE-EGR CYLINDER DETECTION UNIT>

PROCESS PERIOD: EVERY COMBUSTION (EVERY 180degCA)

PROCESS PERIOD: 10ms

<IGNITION TIMING CALCULATION UNIT>

ENGINE CONTROL DEVICE

TECHNICAL FIELD

The present invention relates to a control device of an engine, and particularly to an ignition control device of a spark ignition engine.

BACKGROUND ART

As a background technique in this related art, there is disclosed JP 10-73068 A (PTL 1). In the publication, there is disclosed "an ignition timing control device of an internal combustion engine equipped with an ignition timing control means to control an ignition timing of the internal combustion engine, comprising: an air-fuel-ratio detection means which is provided in an exhaust system of the engine; and an air-fuel ratio estimation means which sets an observer to observe an inner state on the basis of a model describing a behavior of the exhaust system of the engine and receives an output of the air-fuel-ratio detection means to estimate an air-fuel ratio of each cylinder, wherein the ignition timing control means controls the ignition timing of each cylinder of the engine according to an estimated air-fuel ratio of each cylinder." (see [Claim 1]). In addition, there is disclosed JP 2010-242630 A (PTL 2). In the publication, there are disclosed "a control device of a multi-cylinder engine, comprising: a supplying air adjustment means that adjusts an air amount to be supplied into a cylinder; an EGR passage through which part of an exhaust is recirculated to an intake system; an EGR gas amount adjustment means which adjusts an EGR gas amount recirculating to the intake system through the EGR passage; a combustion state estimation means which detects or estimates a combustion state of an air-fuel mixture; an air-fuel-ratio detection means which detects an air-fuel ratio of the exhaust; and a control means which controls the supplying air adjustment means and the EGR gas amount adjustment means, wherein the control means performs the EGR at the time of a heavy load operation in which a load of the engine is equal to or more than a predetermined value, and obtains a variation degree of the combustion state between the cylinders and/or a variation degree of the air-fuel ratio between the cylinders on the basis of at least one of an estimation result of the combustion state estimation means and a detection result of the air-fuel-ratio detection means, and controls an EGR rate on the basis of the variation degree," and "the control device of the multi-cylinder engine in which the control means controls also an ignition timing in addition to the EGR rate (see [Claim 2] and [Claim 3]).

CITATION LIST

Patent Literature

PTL 1: JP 10-73068 A
PTL 2: JP 2010-242630 A

SUMMARY OF INVENTION

Technical Problem

PTL 1 fails in taking that a combustion performance is degraded due to the variation in EGR amount among the cylinders into consideration.

In addition, it is not possible in PTL 2 that a cylinder causing a variation in EGR amount is specified to suppress the combustion stability from being degraded in every cylinder.

The invention has been made in view of the above problems, and an object thereof is to provide a spark ignition engine in which a cylinder causing a degradation of a combustion stability is specified when a variation in the EGR amount occurs among the cylinders, and suppresses the subject cylinder from being degraded in the combustion stability.

Solution to Problem

In order to solve the above problems, the configurations disclosed in claims are employed for example.

Advantageous Effects of Invention

According to the invention, a cylinder having an excessive EGR amount is specified at the time when the EGR amount varies between the cylinders, and a parameter related to an ignition control of the subject cylinder is corrected to suppress the stability of the subject cylinder from being degraded.

DESCRIPTION OF EMBODIMENTS

Hereinafter, embodiments will be described using the drawings.

First Embodiment

In this embodiment, the description will be given about an example in which a cylinder having the richest air-fuel ratio is detected using an air-fuel ratio sensor of an exhaust manifold integrated part at the time of executing the external EGR, and an ignition timing of the subject cylinder is advanced.

Figure 1:
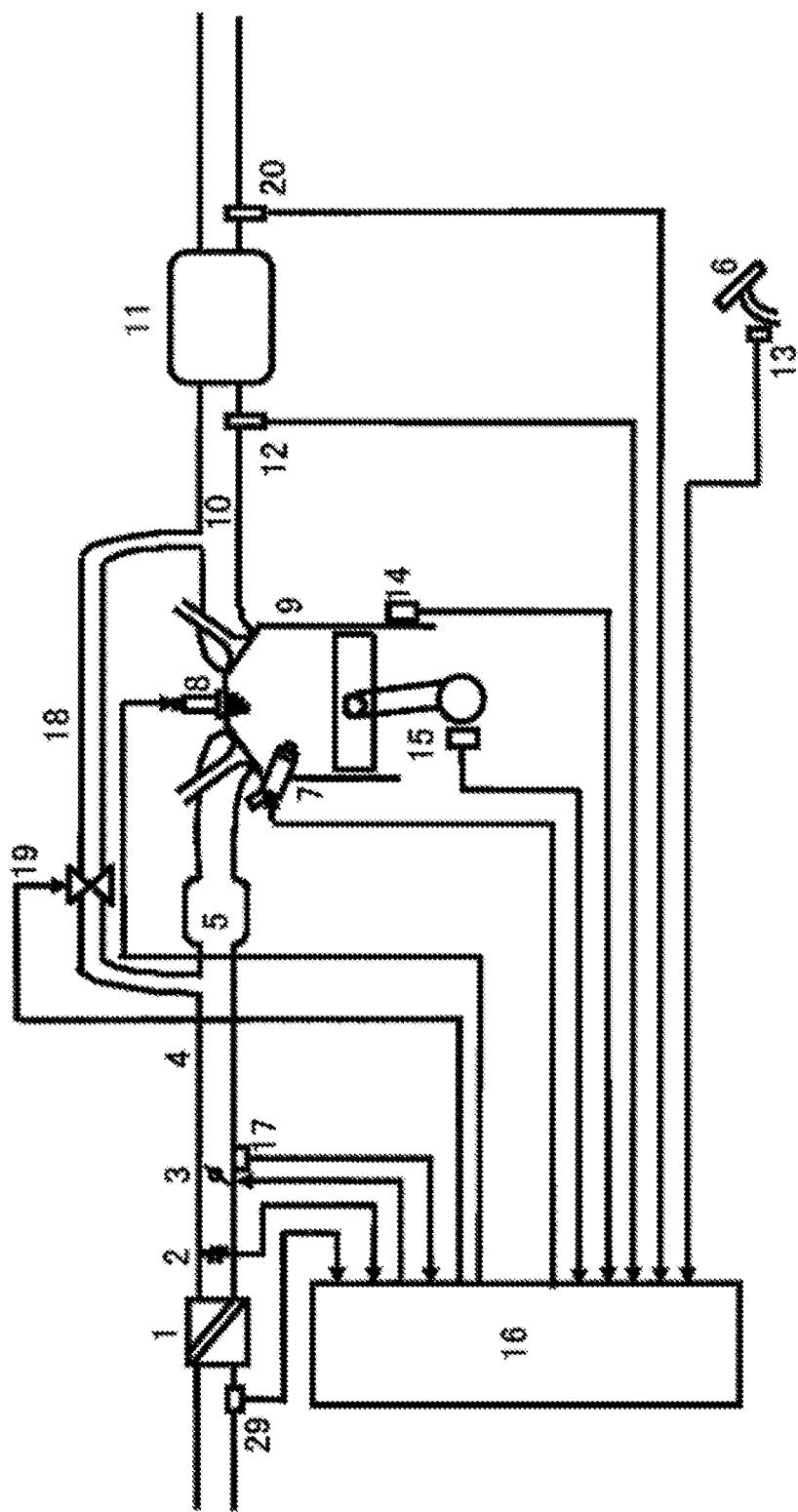
FIG. 1 is a diagram of an engine control system in first, third, fourth, and fifth embodiments.

FIG. 1 is a system diagram illustrating this embodiment. In a multi-cylinder engine 9 (herein, four cylinders), the air from the outside passes through an air cleaner 1, and flows into the cylinder via an intake manifold 4 and a collector 5. An intake amount of air is adjusted by an electronic throttle 3. The intake amount of air is detected by an air flow sensor 2. In addition, an intake air temperature is detected by an intake air temperature sensor 29. In a crank angle sensor 15, a signal is output every rotation angle of 10° of a crank shaft and every combustion period. A water temperature sensor 14 detects a coolant temperature of the engine 9. In addition, an accelerator opening sensor 13 detects a stepping amount of an accelerator 6, and thus detects a demand torque of a driver.

The signals of the accelerator opening sensor 13, the air flow sensor 2, the intake air temperature sensor 29, and a throttle opening sensor 17 attached to the electronic throttle 3, the crank angle sensor 15, the water temperature sensor 14 are transmitted to a control unit 16 described below. An operation state of the engine 9 is obtained from these sensor outputs, and an air amount, a fuel injection amount, an ignition timing, and a main operation amount of the engine 9 of an EGR amount are optimally calculated.

A target air amount calculated in the control unit 16 is converted from a target throttle opening to an electronic throttle drive signal, and transmitted to the electronic throttle 3. The fuel injection amount is converted into a value opening pulse signal, and transmitted to a fuel injection valve (injector) 7. In addition, a drive signal to be ignited at the ignition timing calculated by the control unit 16 is transmitted to an ignition plug 8. In addition, a drive signal is transmitted to an EGR valve 19 such that a target EGR amount calculated by the control unit 16 is executed.

The injected fuel is mixed with the air from the intake manifold, and flows into the cylinder of the engine 9 so as to form an air-fuel mixture. The air-fuel mixture is exploded by a spark generated from the ignition plug 8 at a predetermined ignition timing. The piston is pushed down by the combustion pressure to be power of the engine 9. The exhaust after the explosion is sent to a three-way catalyst 11 through an exhaust manifold 10. Part of the exhaust is recirculated to the intake side through an exhaust recirculating pipe 18. The amount of recirculation is controlled by the EGR valve 19.

The air-fuel ratio sensor 12 of the upstream of the catalyst is attached between the engine 9 and the three-way catalyst 11. The O2 sensor 20 of the downstream of the catalyst is attached on the downstream side of the three-way catalyst 11.

Figure 2:
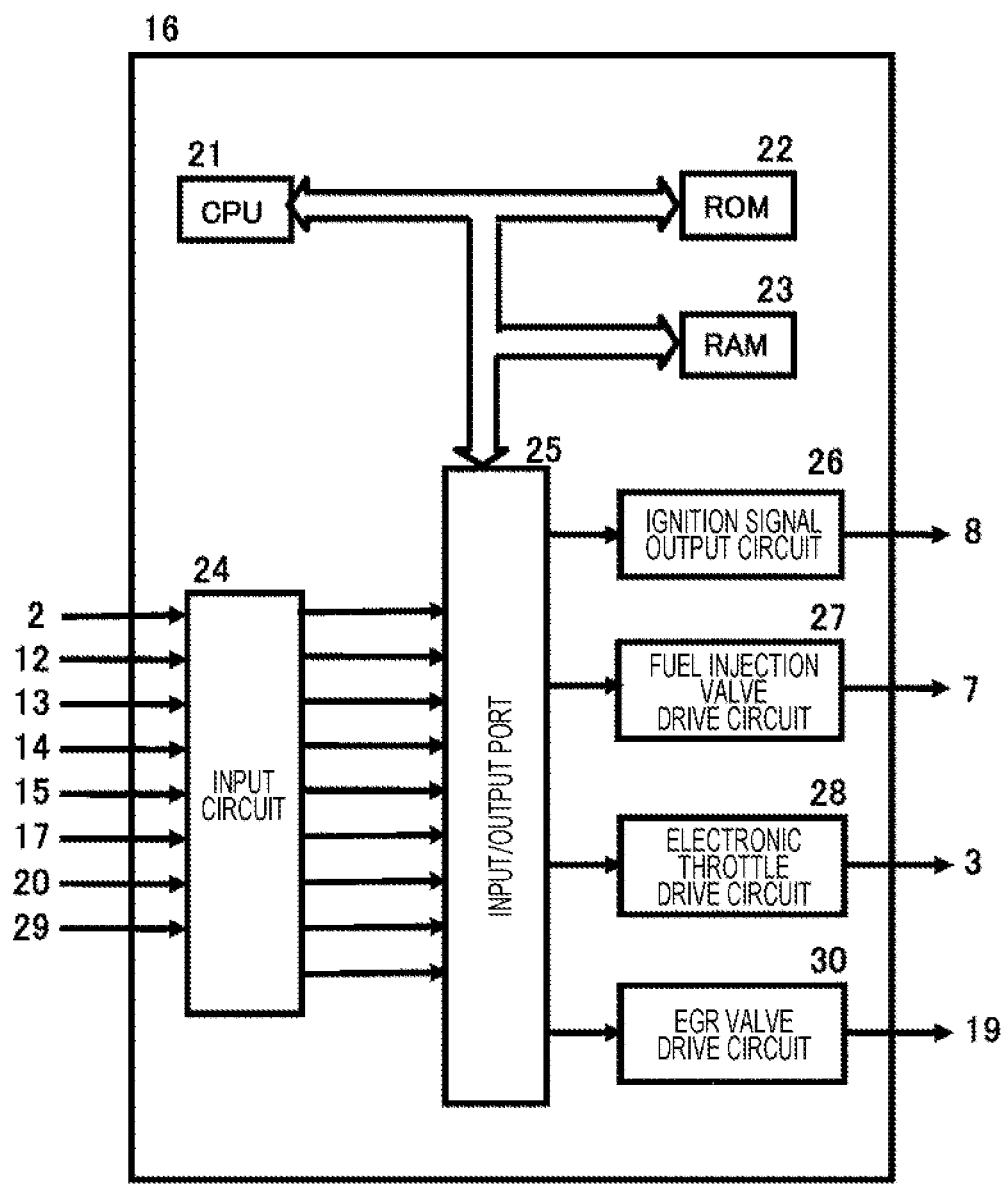
FIG. 2 is a diagram illustrating an inner configuration of a control unit in the first, third, fourth, and fifth embodiments.

FIG. 2 is a diagram illustrating an inner configuration of the control unit 16. In an ECU 16, the output values of the respective sensors such as the air flow sensor 2, the air-fuel ratio sensor 12 of the upstream of the catalyst, the accelerator opening sensor 13, the water temperature sensor 14, the crank angle sensor 15, the throttle opening sensor 17, the O2 sensor 20 of the downstream of the catalyst, the intake air temperature sensor 29, and a speed sensor are input. These output values are subjected to a signal processing such as noise removal by an input circuit 24 and then transmitted to an input/output port 25. The values of the input port is managed by a RAM 23, and subjected to a calculation processing in a CPU 21. A control program describing the content of the calculation processing is written in a ROM 22 in advance. The values indicating the respective actuator operation amounts calculated according to the control program are stored in the RAM 23, and then transmitted to the input/output port 25. An operation signal of the ignition plug 8 is set to an ON/OFF signal which is turned on at the time when the primary coil in an ignition output circuit is energized, and turned off at the time when the coil is de-energized. The ignition timing is a time to be turned off from on. A signal which is set to the output port for the ignition plug 8 is amplified for an ignition output circuit 26 to have energy enough for the combustion, and supplied to the ignition plug 8. In addition, a drive signal of the fuel injection valve 7 is set to an ON/OFF signal which is turned on at the time of opening and turned off at the time of closing. The drive signal is amplified for a fuel injection valve drive circuit 27 to have energy enough to open the fuel injection valve 7, and transmitted to the fuel injection valve 7. A drive signal to realize a target opening of the electronic throttle 3 is transmitted to the electronic throttle 3 through an electronic throttle drive circuit 28. A drive signal to realize a target opening of the EGR valve 19 is transmitted to the EGR valve 19 through an EGR valve drive circuit 30.

Figure 3:
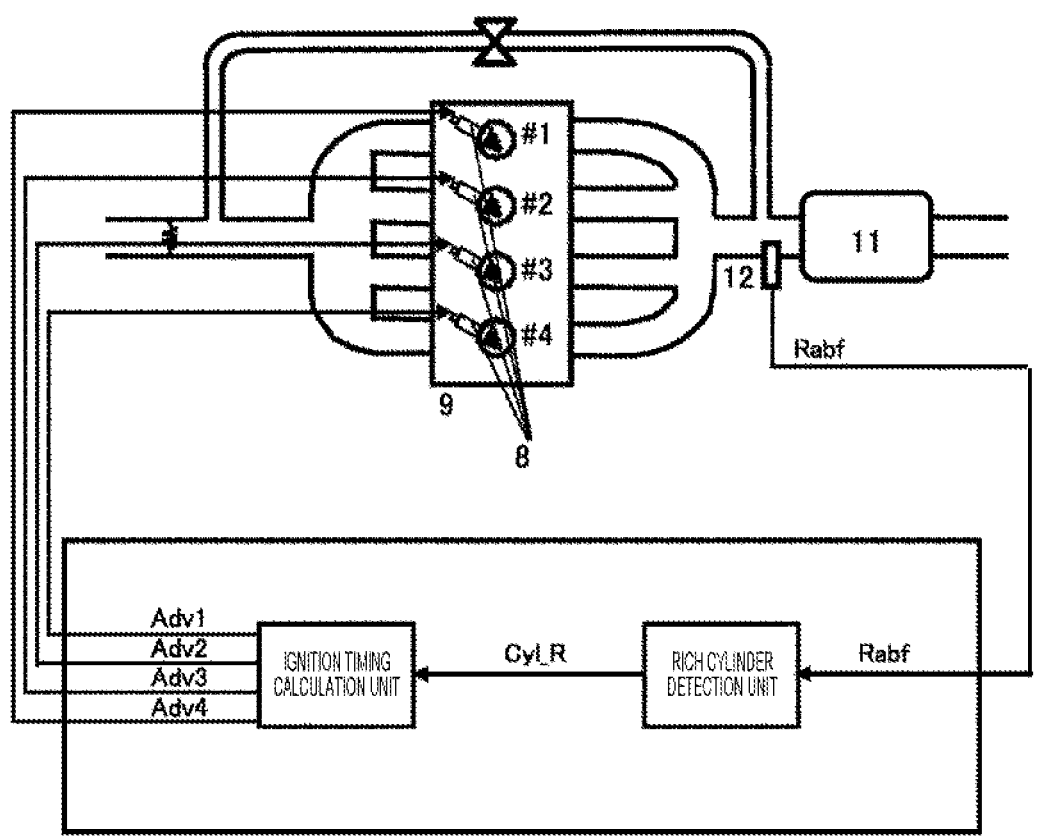
FIG. 3 is a block diagram illustrating the entire control in the first and fifth embodiments.

Hereinafter, the description will be given about the control program written in the ROM 22. FIG. 3 is a block diagram illustrating the entire control, which is configured by the following calculation units.

Figure 4:
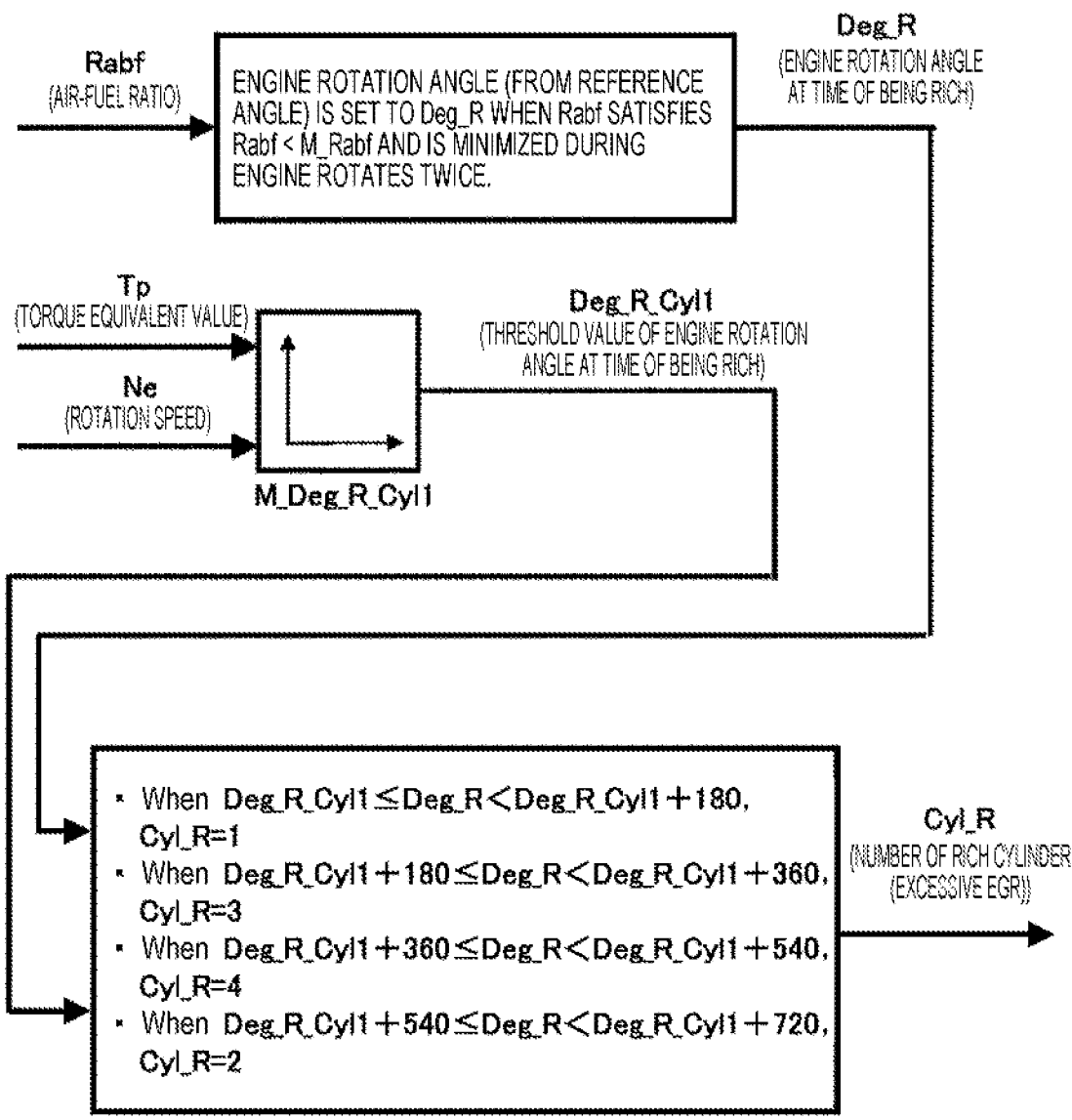
FIG. 4 is a block diagram of a rich cylinder detection unit in the first, second, and fifth embodiments.
Figure 5:
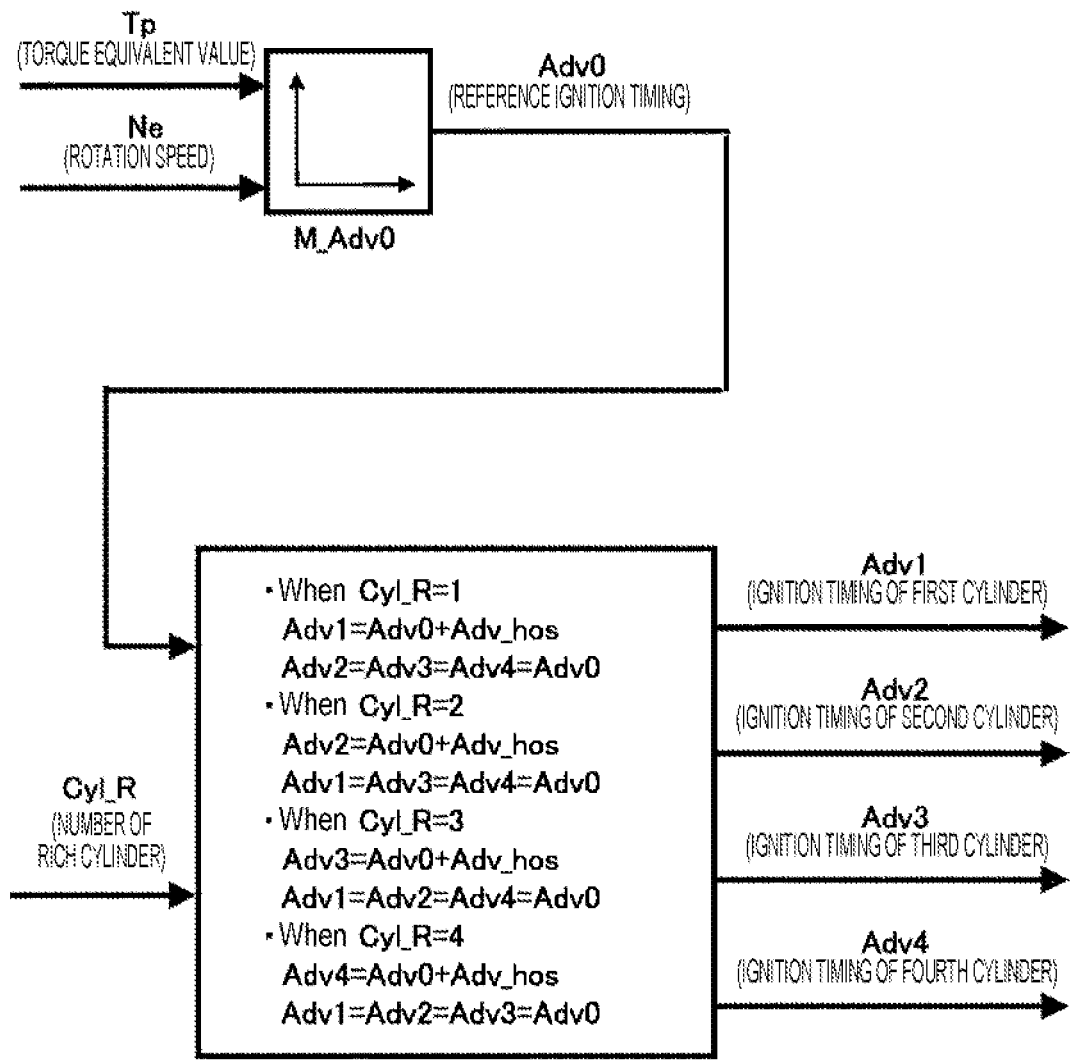
FIG. 5 is a block diagram of an ignition timing calculation unit in the first, third, and fourth embodiments.

Rich cylinder detection unit (FIG. 4)
Ignition timing calculation unit (FIG. 5)

The "rich cylinder detection unit" calculates the number (Cyl_R) of a cylinder of which the air-fuel ratio is richest. The "ignition timing calculation unit" calculates the ignition timings (Adv1 to Adv4) of the first to fourth cylinders. The ignition timing of the cylinder indicated by Cyl_R is advanced by a predetermined amount. Hereinafter, the details of the respective calculation units will be described.

<Rich Cylinder Detection Unit (FIG. 4)>

In this calculation unit, Cyl_R (the number of the rich cylinder (excessive EGR)) is calculated. The details are illustrated in FIG. 4.

When an external EGR amount is equal to or more than a predetermined amount, this process is performed. The external EGR control will not be described here in detail since there are a number of well-known techniques.

The engine rotation angle (from a reference angle) is set to Deg_R when Rabf satisfies Rabf<M_Rabf and is minimized during a period of the engine rotates twice. The reference angle may be a predetermined angle such as an intake TDC of a specific cylinder.

A value obtained with reference to a map M_Deg_R_Cyl1 using TP (torque equivalent value) and Ne (rotation speed) is set to Deg_R_Cyl1 (a threshold value of the engine rotation angle at the time of being rich).

When Deg_R_Cyl1≤Deg_R<Deg_R_Cyl1+180, Cyl_R=1
When Deg_R_Cyl1+180≤Deg_R<Deg_R_Cyl1+360, Cyl_R=3
When Deg_R_Cyl1+360≤Deg_R<Deg_R_Cyl1+540, Cyl_R=4
When Deg_R_Cyl1+540≤Deg_R<Deg_R_Cyl1+720, Cyl_R=2

M_Rabf is a target air-fuel ratio in an air-fuel ratio feedback control or an average air-fuel ratio of all the cylinders.

The calculation method of TP is a well-known technique, and obtained by the following formula using Qa (air amount) and Ne (rotation speed) for example.

$$K \times Qa/(Ne \times Cyl)$$

Herein, K is a calibration coefficient for the conversion to the torque equivalent value, and Cyl is the number of cylinders of the engine. The map M_Deg_R_Cyl1 is determined according to the engine specification, a position where the air-fuel ratio sensor is attached, and characteristics. The map may be determined from a prototype test.

<Ignition Timing Calculation Unit (FIG. 5)>

In this calculation unit, Adv1 to Adv4 (ignition timings of the first to fourth cylinders) are calculated. The details are illustrated in FIG. 5.

A value obtained with reference to a map M_Adv0_using TP (torque equivalent value) and Ne (rotation speed) is set to Adv0 (reference ignition timing).
When Cyl_R=1
   Adv1=Adv0+Adv_hos
   Adv2=Adv3=Adv4=Adv0
When Cyl_R=2
   Adv2=Adv0+Adv_hos
   Adv1=Adv3=Adv4=Adv0
When Cyl_R=3
   Adv3=Adv0+Adv_hos
   Adv1=Adv2=Adv4=Adv0
When Cyl_R=4
   Adv4=Adv0+Adv_hos
   Adv1=Adv2=Adv3=Adv0

Further, since a minimum value of Rabf (air-fuel ratio) obtained by the rich cylinder detection unit is a rich degree, Adv_hos (advance angle correction amount) may be changed according to the rich degree (according to an excessive EGR amount).

Second Embodiment

In this embodiment, the description will be given about an example in which a cylinder having the richest air-fuel ratio is detected using the air-fuel ratio sensor of the exhaust manifold integrated part at the time of performing the inner EGR, and an ignition energy of the subject cylinder is increased.

Figure 6:
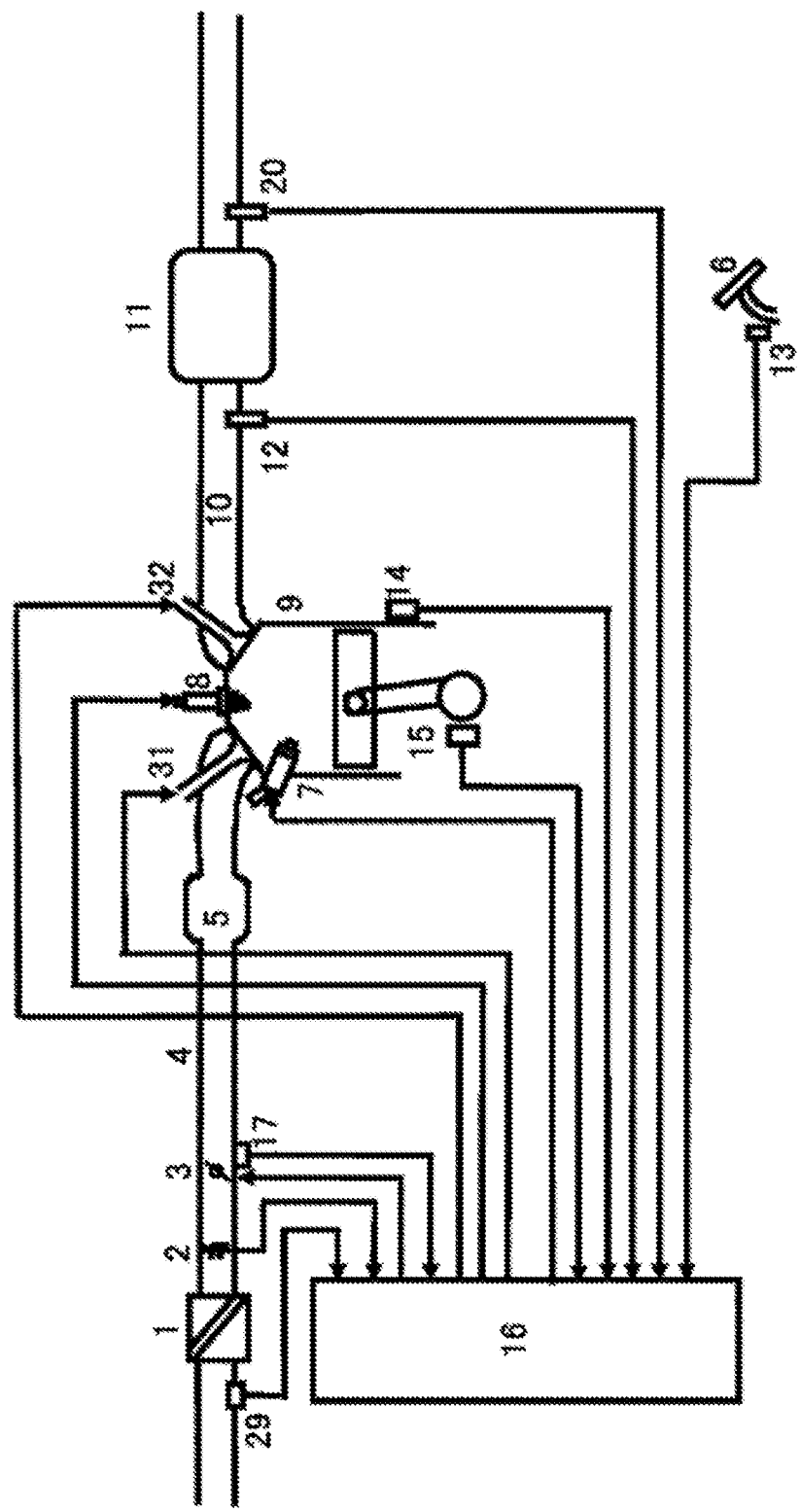
FIG. 6 is a diagram of the engine control system in the second embodiment.

FIG. 6 is a system diagram illustrating this embodiment. There is provided no external EGR system compared to the first embodiment (FIG. 1). In addition, there are provided an intake valve 31 and an exhaust valve 32 of which the opening/closing timing is controllable. A drive signal is transmitted to the intake valve 31 and the exhaust valve 32 to realize a target opening/closing timing of the intake valve and the exhaust valve which is calculated by the control unit 16. The other configurations are the same as those of the first embodiment (FIG. 1), and thus the details will not be described.

Figure 7:
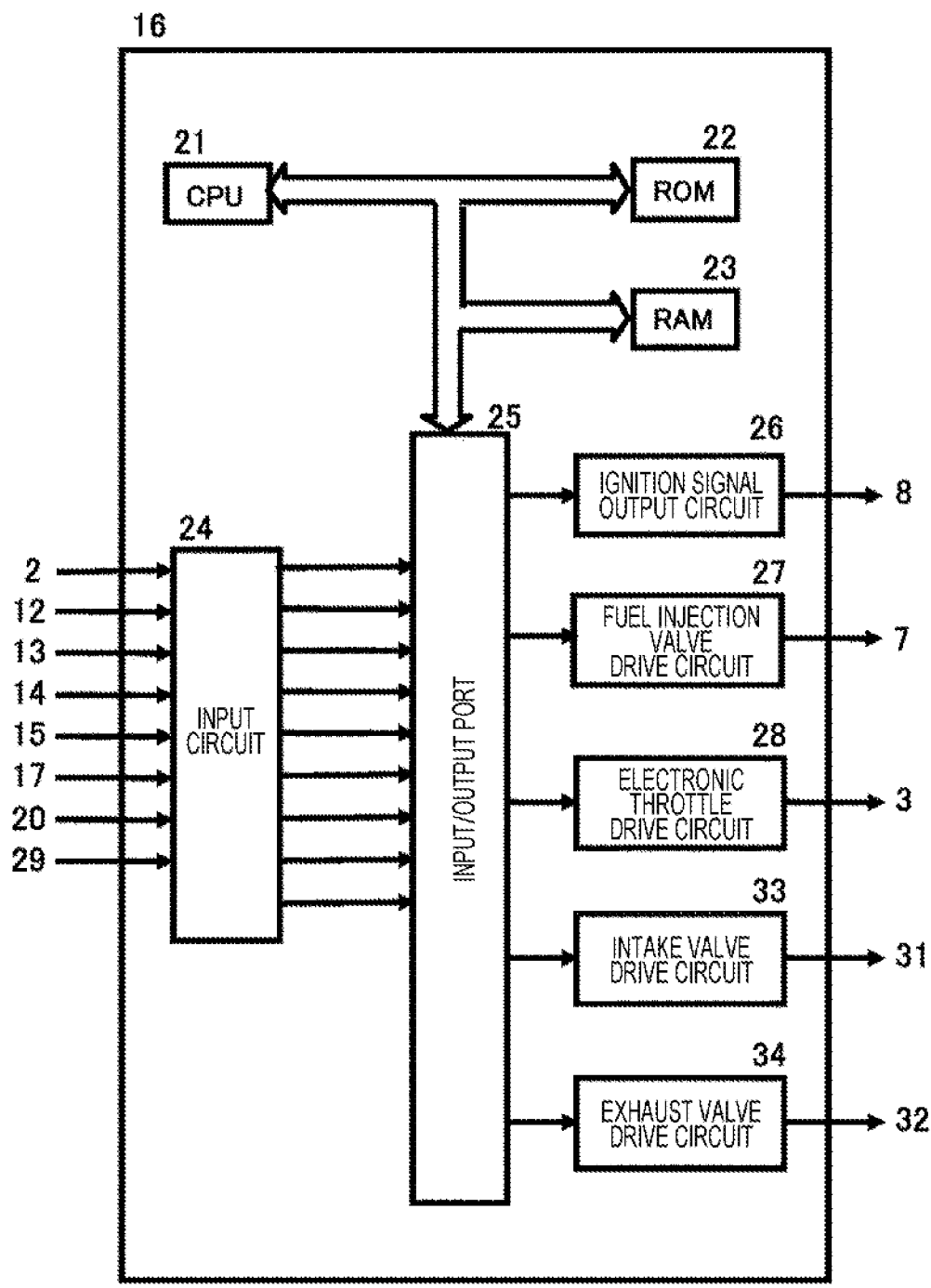
FIG. 7 is a diagram illustrating an inner configuration of the control unit in the second embodiment.

FIG. 7 illustrates the inner configuration of the control unit 16, in which an intake valve drive circuit 33 and an exhaust valve drive circuit 34 are added to the first embodiment (FIG. 2). The other configurations are the same as those of the first embodiment (FIG. 1), and thus the details will not be described.

Figure 8:
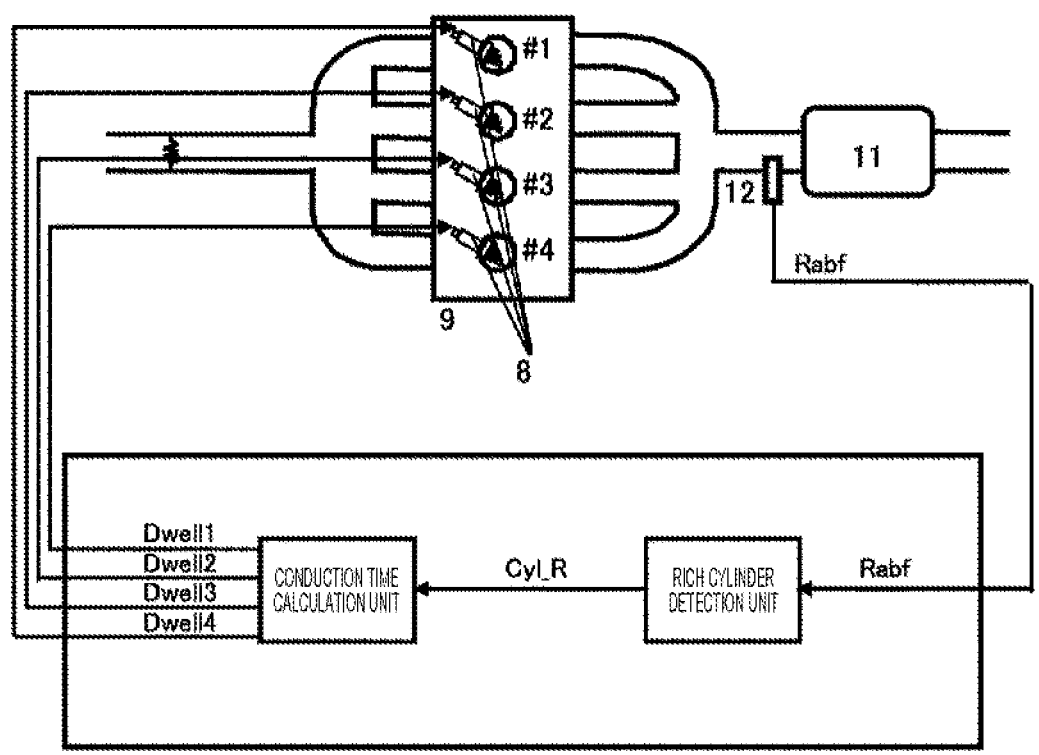
FIG. 8 is a block diagram illustrating the entire control in the second embodiment.
Figure 9:
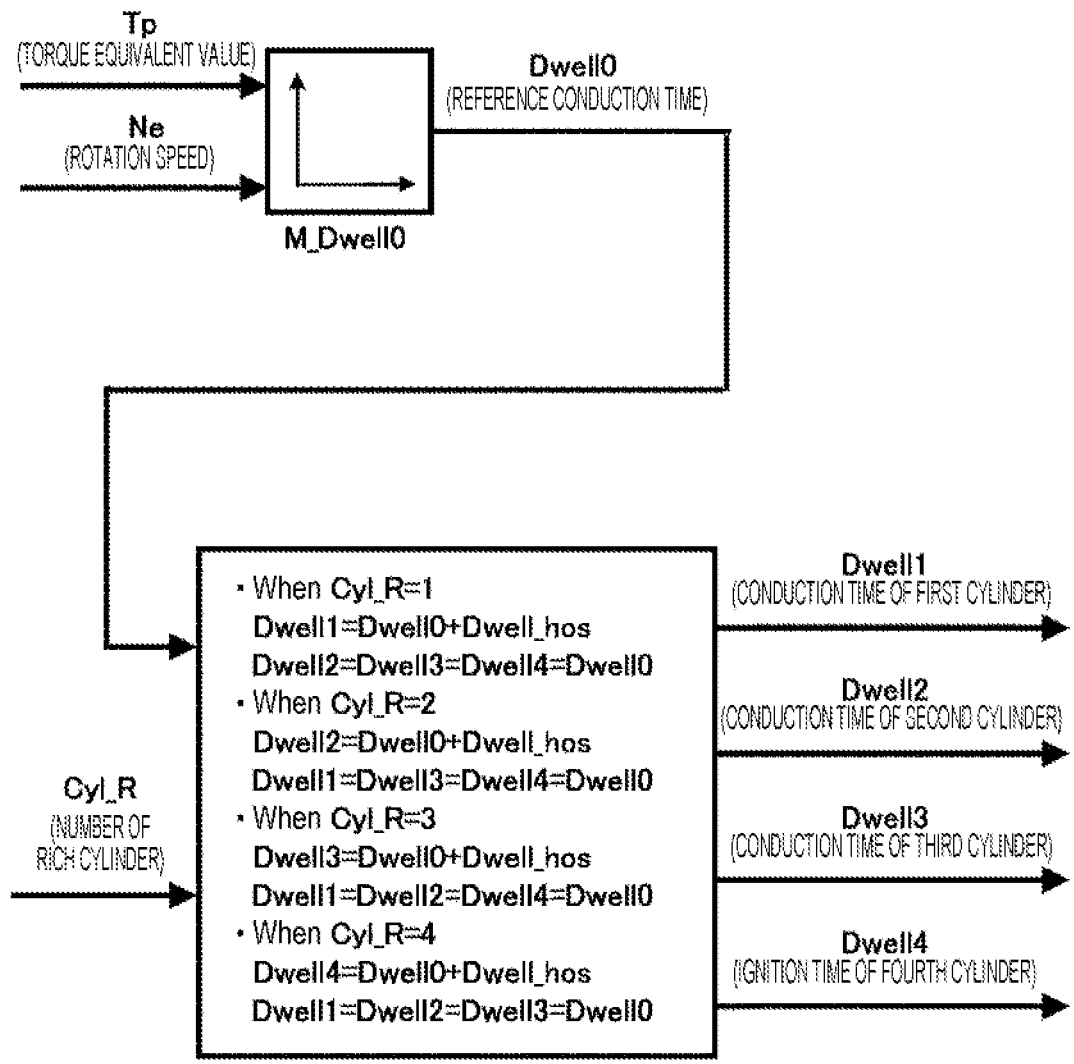
FIG. 9 is a block diagram of a conduction time calculation unit in the second embodiment.

Hereinafter, the description will be given about the control program written in the ROM 22. FIG. 8 is a block diagram illustrating the entire control which is configured by the following calculation units.
   Rich cylinder detection unit (FIG. 4)
   Conduction time calculation unit (FIG. 9)

The "rich cylinder detection unit" calculates the number (Cyl_R) of a cylinder of which the air-fuel ratio is richest. The "conduction calculation unit" calculates conduction times (Dwell1 to Dwell4) toward ignition coils of the first to fourth cylinders. The conduction time toward the ignition coil of the cylinder indicated by Cyl_R is lengthened by a predetermined amount. Hereinafter, the details of the respective calculation units will be described.

<Rich Cylinder Detection Unit (FIG. 4)>

In this calculation unit, Cyl_R (the number of rich cylinder (excessive EGR)) is calculated. While being illustrated in FIG. 3, the details are the same as those of the first embodiment, and thus will not be described. Further, this process is performed when an inner EGR amount is equal to or more than a predetermined amount. Since there are a lot of well-known techniques about the inner EGR control, the details thereof will not be described.

<Conduction Time Calculation Unit (FIG. 9)>

This calculation unit calculates Dwell1 to Dwell4 (the conduction times of the first to fourth cylinders). The details are illustrated in FIG. 9.

A value obtained with reference to a map M_Dwell0 using TP (torque equivalent value) and Ne (rotation speed) is set to Dwell0 (reference conduction time).
When Cyl_R=1
   Dwell1=Dwell0+Dwell_hos
   Dwell2=Dwell3=Dwell4=Dwell0
When Cyl_R=2
   Dwell2=Dwell0+Dwell_hos
   Dwell1=Dwell3=Dwell4=Dwell0
When Cyl_R=3
   Dwell3=Dwell0+Dwell_hos
   Dwell1=Dwell2=Dwell4=Dwell0
When Cyl_R=4
   Dwell4=Dwell0+Dwell_hos
   Dwell1=Dwell2=Dwell3=Dwell0

Further, since a minimum value of Rabf (air-fuel ratio) obtained by the rich cylinder detection unit is a rich degree, Dwell_hos (advance angle correction amount) may be changed according to the rich degree (according to an excessive EGR amount).

Third Embodiment

In this embodiment, the description will be given about an example in which a cylinder having the richest air-fuel ratio is detected using a two-rotational frequency component of the engine in the signals of the air-fuel ratio sensors of the exhaust manifold integrated part at the time of executing the external EGR, and the ignition timing of the subject cylinder is advanced.

FIG. 1 is a system diagram illustrating this embodiment. The configurations are the same as those of the first embodiment (FIG. 1), and thus the details will not be described.

FIG. 2 is a diagram illustrating the inner configuration of the control unit 16 which is the same as that of the first embodiment (FIG. 2), and thus the details will not be described.

Figure 10:
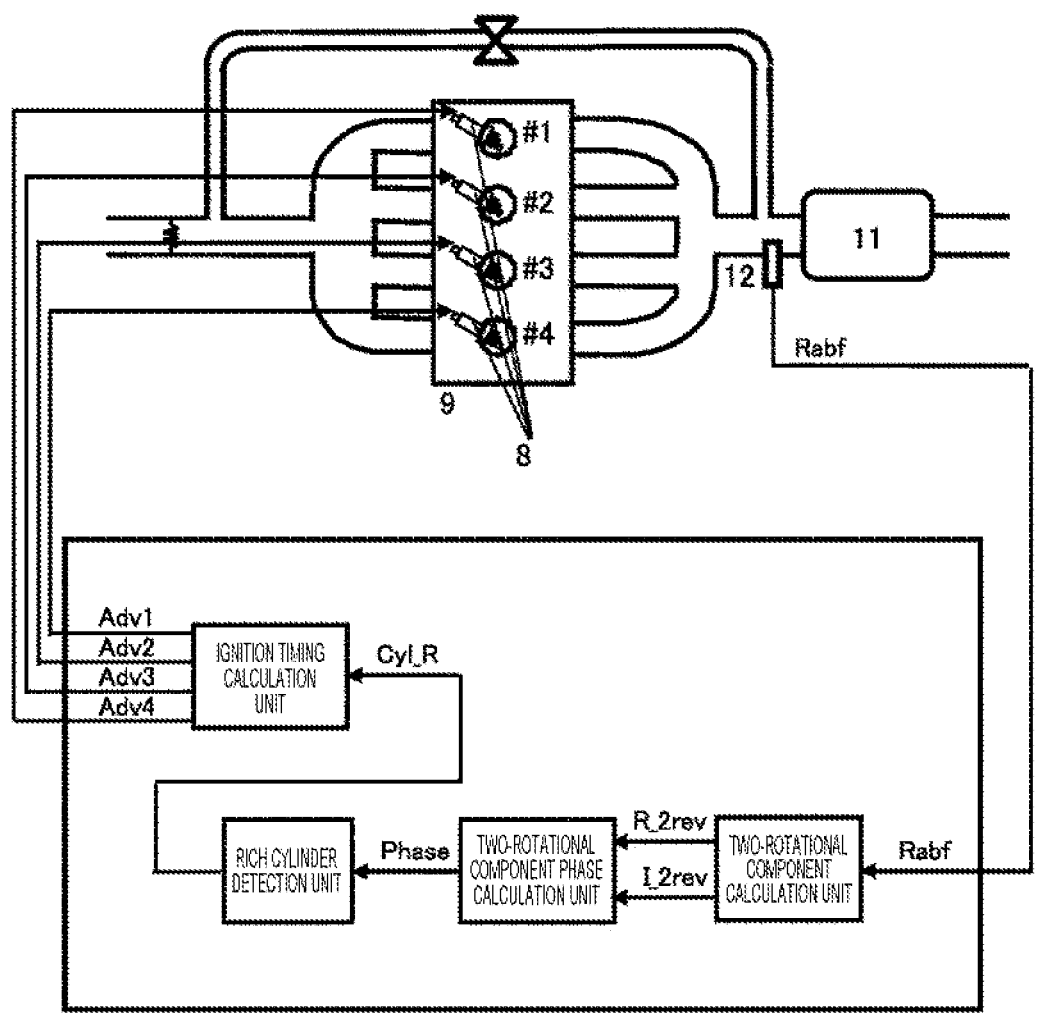
FIG. 10 is a block diagram illustrating the entire control in the third embodiment.

Hereinafter, the description will be given about the control program written in the ROM 22. FIG. 10 is a block diagram illustrating the entire control which is configured by the following calculation units.

Two-rotational component calculation unit (FIG. 11)
Two-rotational component phase calculation unit (FIG. 12)
Rich cylinder detection unit (FIG. 13)
Ignition timing calculation unit (FIG. 5)

The "two-rotational component calculation unit" calculates a real part (R_2rev) and an imaginary part (I_2rev) of the two-rotational component of the signal (Rabf) of the air-fuel ratio sensor 12. The "two-rotational component phase calculation unit" calculates a two-rotational component phase (Phase) from R_2rev and I_2rev. The "rich cylinder detection unit" calculates the number (Cyl_R) of a cylinder of which the air-fuel ratio is richest. The "ignition timing calculation unit" calculates the ignition timings (Adv1 to Adv4) of the first to fourth cylinders. The ignition timing of the cylinder indicated by Cyl_R is advanced by a predetermined amount. Hereinafter, the details of the respective calculation units will be described.

<Two-Rotational Component Calculation Unit (FIG. 11)>

Figure 11:
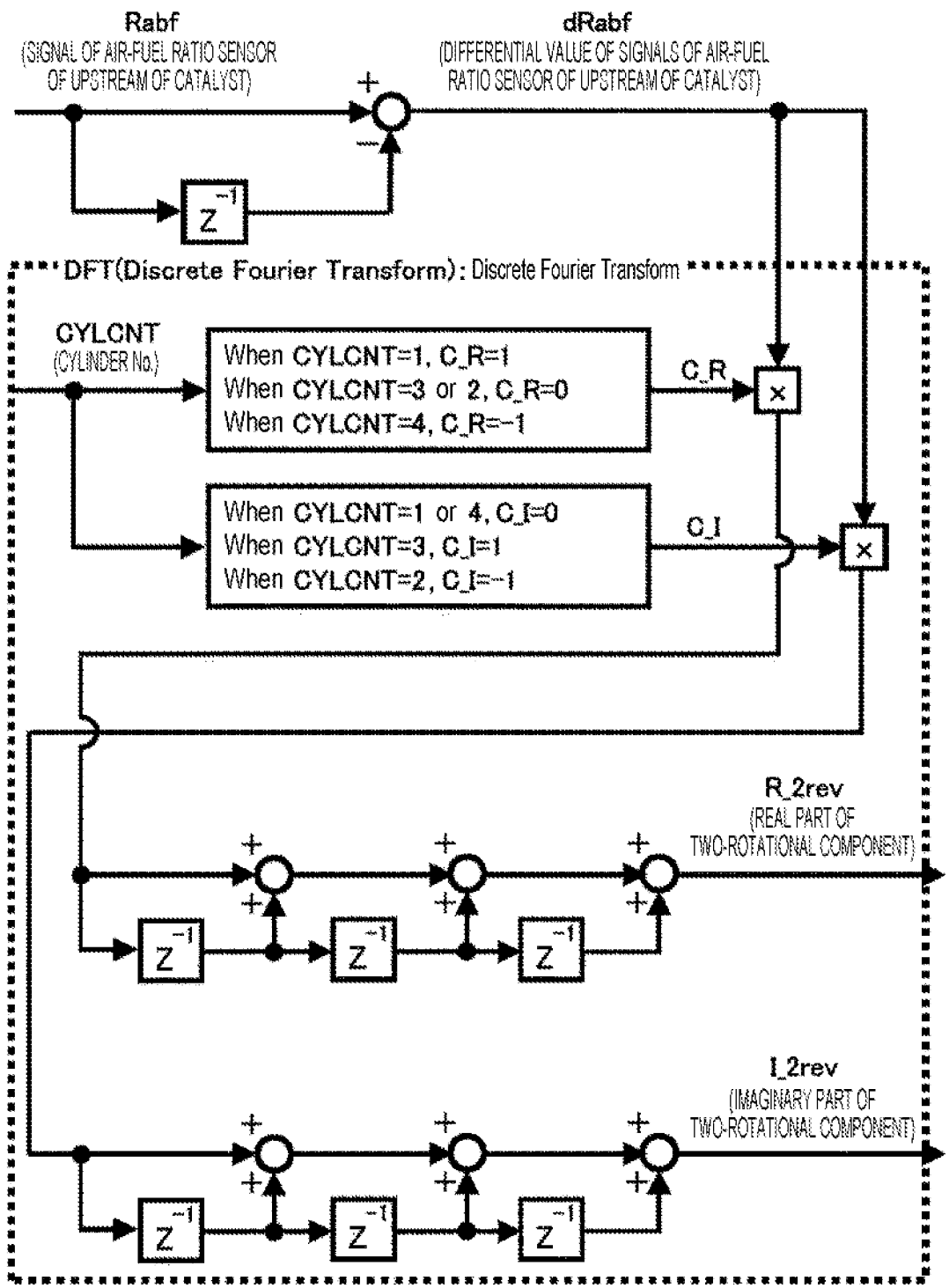
FIG. 11 is a block diagram of a two-rotational component calculation unit in the third and fourth embodiments.

In this calculation unit, the real part (R_2rev) and the imaginary part (I_2rev) of the two-rotational component of the signal (Rabf) of the air-fuel ratio sensor 12 are calculated. The details are illustrated in FIG. 11. When an external EGR amount is equal to or more than a predetermined amount, this process is performed. The external EGR control will not be described here in detail since there are a number of well-known techniques.

A difference between a current value and a previous value of Rabf is calculated, and set to dRabf (a differential value of signals of the air-fuel ratio sensor of the upstream of the catalyst). The process (discrete Fourier transform) surrounded by a dotted line in the drawing is performed on dRabf. The current value, the previous value, a first value before the previous value, and a second value before the first value of C_R×dRabf are added and set to R_2rev. In addition, the current value, the previous value, a first value before the previous value, and a second value before the first value of C_I×dRabf are added and set to I_2rev. Herein, C_R and C_I are calculated according to CYLCNT (cylinder No.) as follows. CYLCNT is updated when a piston position of an N-th cylinder is at a predetermined value. Herein, it is assumed that the updating is performed at 110 deg before the compression TDC of the subject cylinder.

When CYLCNT=1, C_R=1
When CYLCNT=3 or 2, C_R=0
When CYLCNT=4, C_R=−1

In addition,
When CYLCNT=1 or 4, C_I=0
When CYLCNT=3, C_I=1
When CYLCNT=2, C_I=−1

When a difference between the current value and the previous value of Rabf is subjected to the Fourier transform, it is possible to detect a cylinder having a relatively rich air-fuel ratio among all the cylinders (a cylinder having an air-fuel ratio richer than an average value of all the cylinders).

<Two-Rotational Component Phase Calculation Unit (FIG. 12)>

Figure 12:
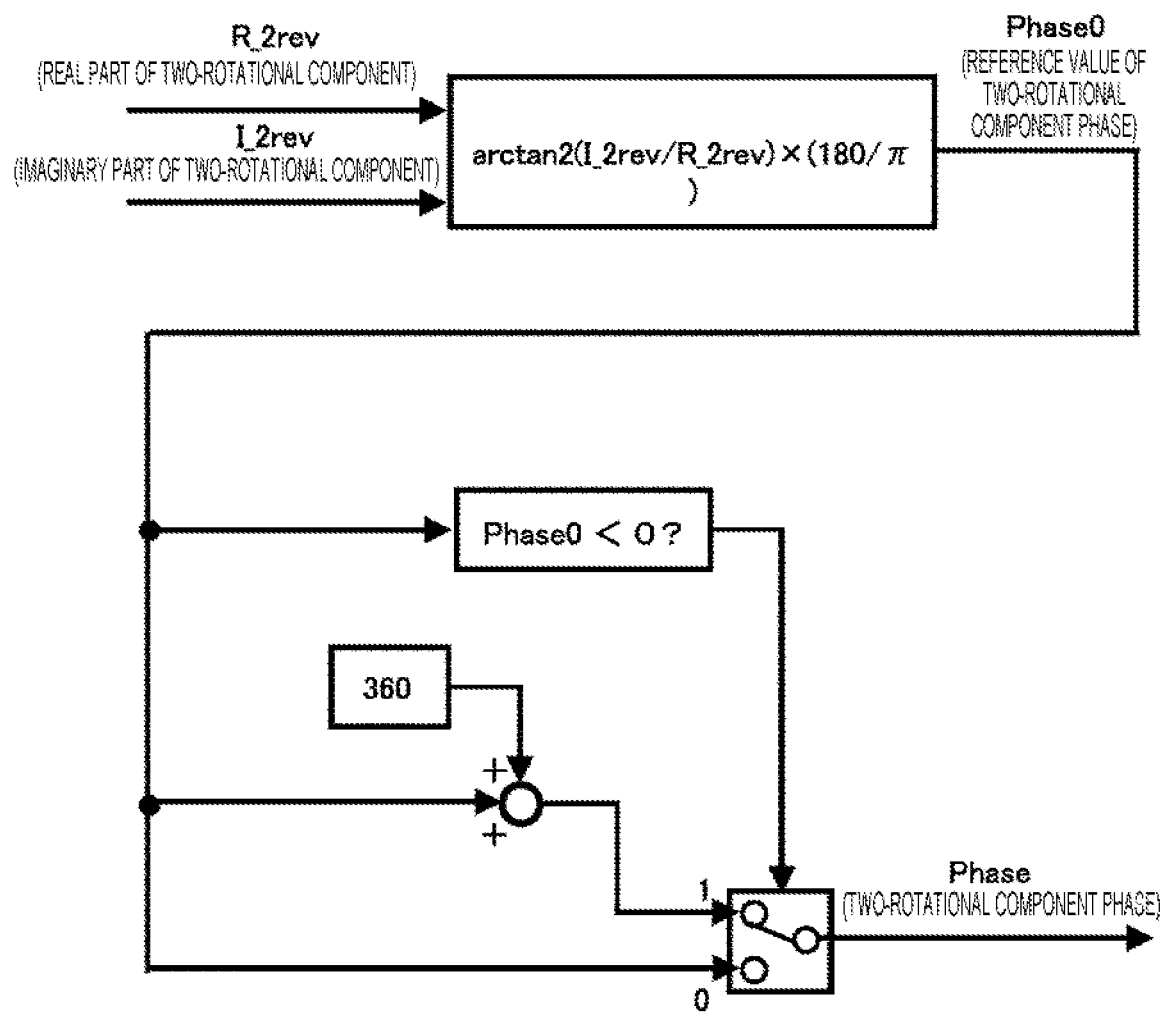
FIG. 12 is a block diagram of a two-rotational component phase calculation unit in the third and fourth embodiments.

In this calculation unit, the two-rotational component phase (Phase) is calculated. The details are illustrated in FIG. 12. When an external EGR amount is equal to or more than a predetermined amount, this process is performed. Phase0 (a reference value of the two-rotational component phase) is obtained from R_2rev and I_2rev as follows.

arc tan 2(I_2rev/R_2rev)×(180/π)

Herein, arc tan 2 calculates an arc tangent value (=phase) corresponding to four quadrants (−180 to 180 deg).

Further, Phase (two-rotational component phase) having a phase range of 0 to 360 deg is obtained. Specifically, Phase=Phase0+360 is set at the time of Phase0<0, and Phase=Phase0 at the other time.

<Rich Cylinder Detection Unit (FIG. 13)>

Figure 13:
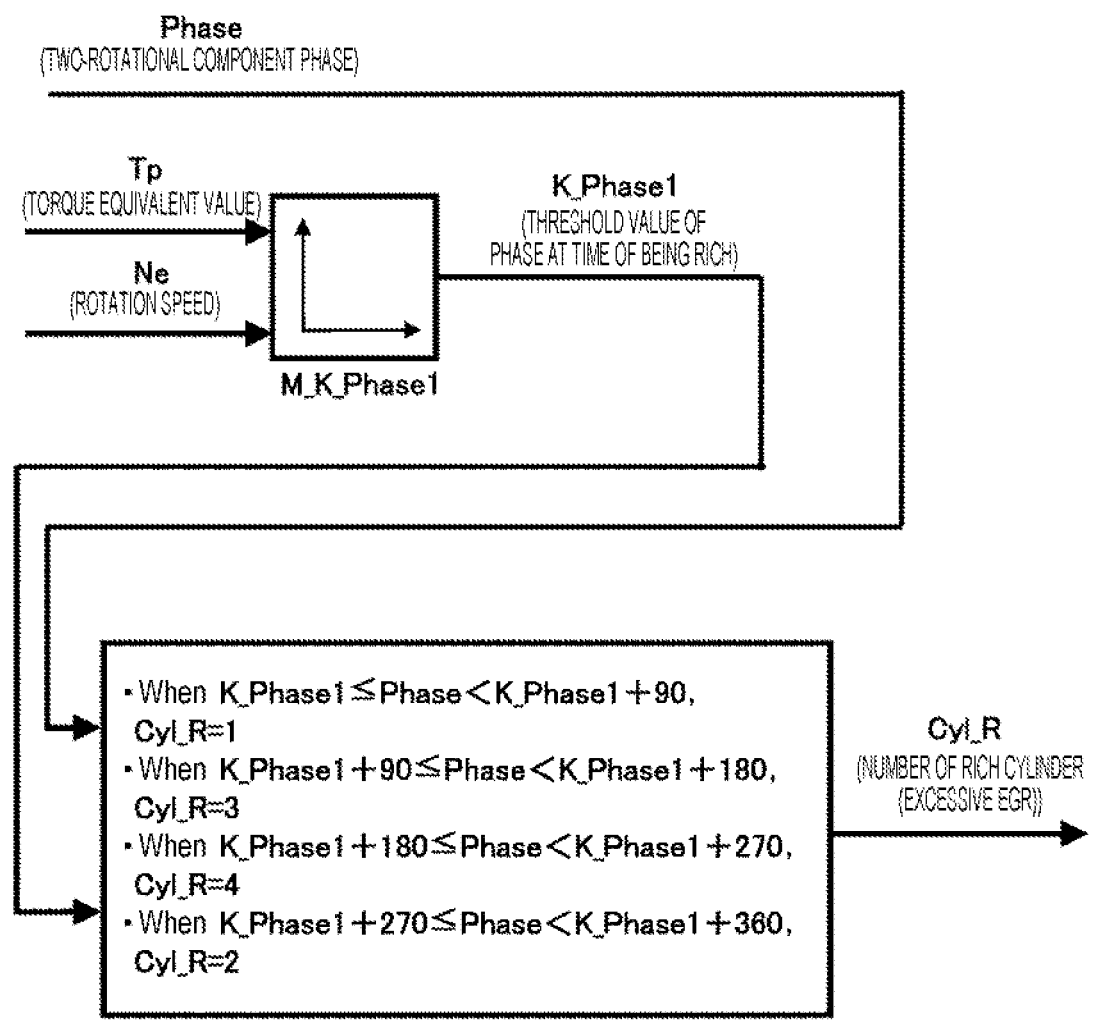
FIG. 13 is a block diagram of a rich cylinder detection unit in the third embodiment.

In this calculation unit, Cyl_R (the number of the rich cylinder (excessive EGR)) is calculated using Phase. The details are illustrated in FIG. 13. When an external EGR amount is equal to or more than a predetermined amount, this process is performed.

A value obtained with reference to a map M_K_Phase1 using TP (torque equivalent value) and Ne (rotation speed) is set to K_Phase1 (threshold value of the phase at the time of being rich).

When K_Phase1≤Phase<K_Phase1+90, Cyl_R=1
When K_Phase1+90≤Phase<K_Phase1+180, Cyl_R=3
When K_Phase1+180≤Phase<K_Phase1+270, Cyl_R=4
When K_Phase1+270≤Phase<K_Phase1+360, Cyl_R=2

The map M_K_Phase1 is determined according to the engine specification, a position where the air-fuel ratio sensor is attached, and characteristics. The map may be determined from a prototype test.

<Ignition Timing Calculation Unit (FIG. 5)>

In this calculation unit, Adv1 to Adv4 (ignition timings of the first to fourth cylinders) are calculated. While being illustrated in FIG. 5, the details are the same as those of the first embodiment, and thus will not be described.

Fourth Embodiment

In this embodiment, the description will be given about an example in which a cylinder having an excessive EGR amount is detected using both the air-fuel ratio sensor of the exhaust manifold integrated part and the crank angle sensor at the time of executing the external EGR, and the ignition timing of the subject cylinder is advanced.

FIG. 1 is a system diagram illustrating this embodiment. The configurations are the same as those of the first embodiment (FIG. 1), and thus the details will not be described.

FIG. 2 is a diagram illustrating the inner configuration of the control unit 16 which is the same as that of the first embodiment (FIG. 2), and thus the details will not be described.

Figure 14:
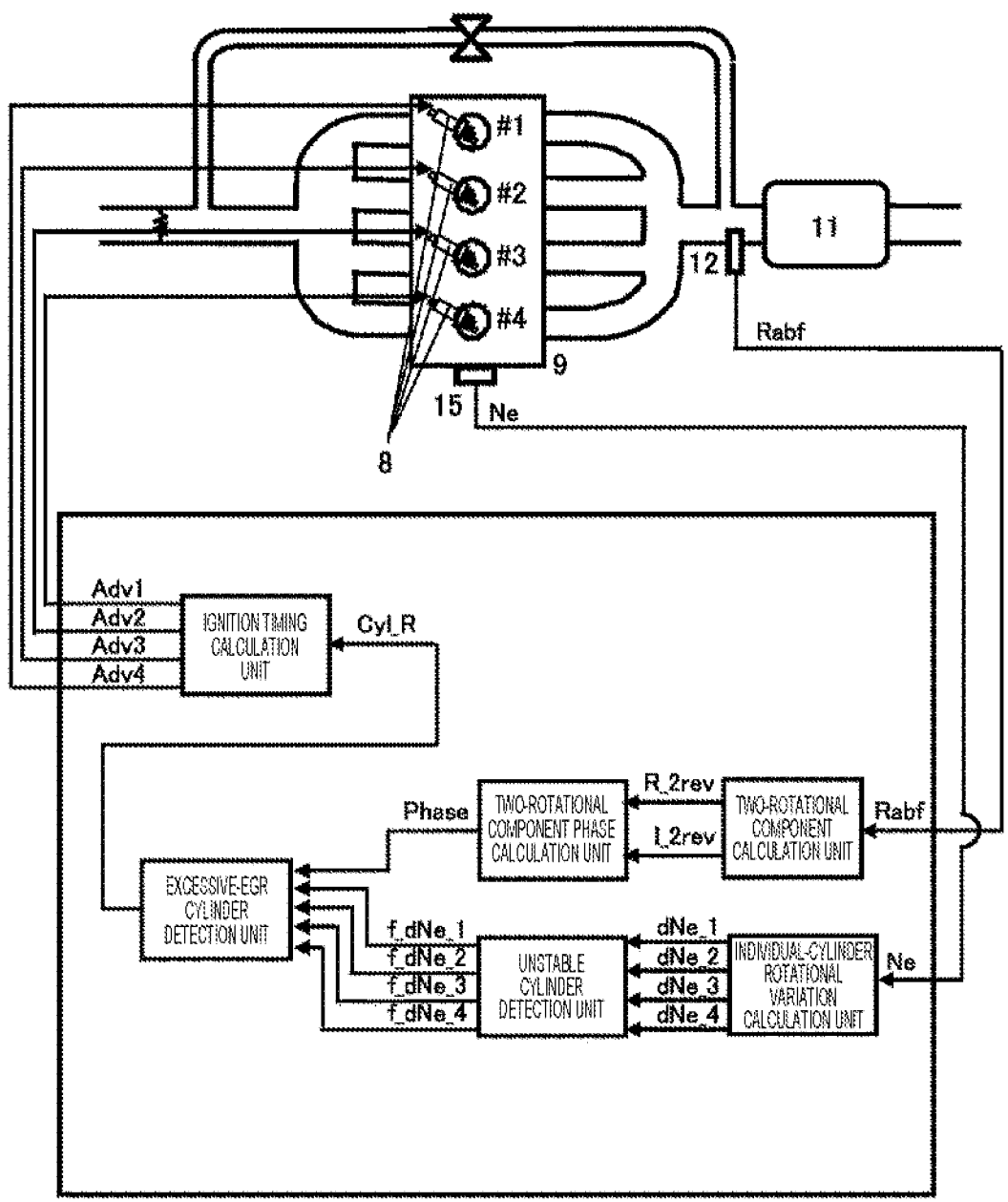
FIG. 14 is a block diagram illustrating the entire control in the fourth embodiment.

Hereinafter, the description will be given about the control program written in the ROM 22. FIG. 14 is a block diagram illustrating the entire control which is configured by the following calculation units.

Two-rotational component calculation unit (FIG. 11)
Two-rotational component phase calculation unit (FIG. 12)
Individual-cylinder rotational variation calculation unit (FIG. 15)
Unstable cylinder detection unit (FIG. 16)
Excessive-EGR cylinder detection unit (FIG. 17)
Ignition timing calculation unit (FIG. 5)

The "two-rotational component calculation unit" calculates a real part (R_2rev) and an imaginary part (I_2rev) of the two-rotational component of the signal (Rabf) of the air-fuel ratio sensor 12. The "two-rotational component phase calculation unit" calculates a two-rotational component phase (Phase) from R_2rev and I_2rev. The "individual-cylinder rotational variation calculation unit" calculates rotational variations (dNe_1, dNe_2, dNe_3, and dNe_4) of the cylinders from a signal of the crank angle sensor 15. The "unstable cylinder detection unit" calculates a cylinder (instability flags of the first to fourth cylinders) (f_dNe_1 to f_dNe_4) which becomes unstable by the excessive EGR amount from dNe_1, dNe_2, dNe_3, and dNe_4. The "excessive-EGR cylinder detection unit" calculates the number (Cyl_R) of the cylinder having a rich air-fuel ratio due to the most excessive EGR amount. The "ignition timing calculation unit" calculates the ignition timings (Adv1 to Adv4) of the first to fourth cylinders. The ignition timing of the cylinder indicated by Cyl_R is advanced by a predetermined amount. Hereinafter, the details of the respective calculation units will be described. Hereinafter, the details of the respective calculation units will be described.

<Two-Rotational Component Calculation Unit (FIG. 11)>

In this calculation unit, the real part (R_2rev) and the imaginary part (I_2rev) of the two-rotational component of the signal (Rabf) of the air-fuel ratio sensor 12 are calculated. While being illustrated in FIG. 11, the details are the same as those of the third embodiment, and thus will not be described.

<Two-Rotational Component Phase Calculation Unit (FIG. 12)>

In this calculation unit, the two-rotational component phase (Phase) is calculated. While being illustrated in FIG. 12, the details are the same as those of the third embodiment, and thus will not be described.

<Individual-Cylinder Rotational Variation Calculation Unit (FIG. 15)>

Figure 15:
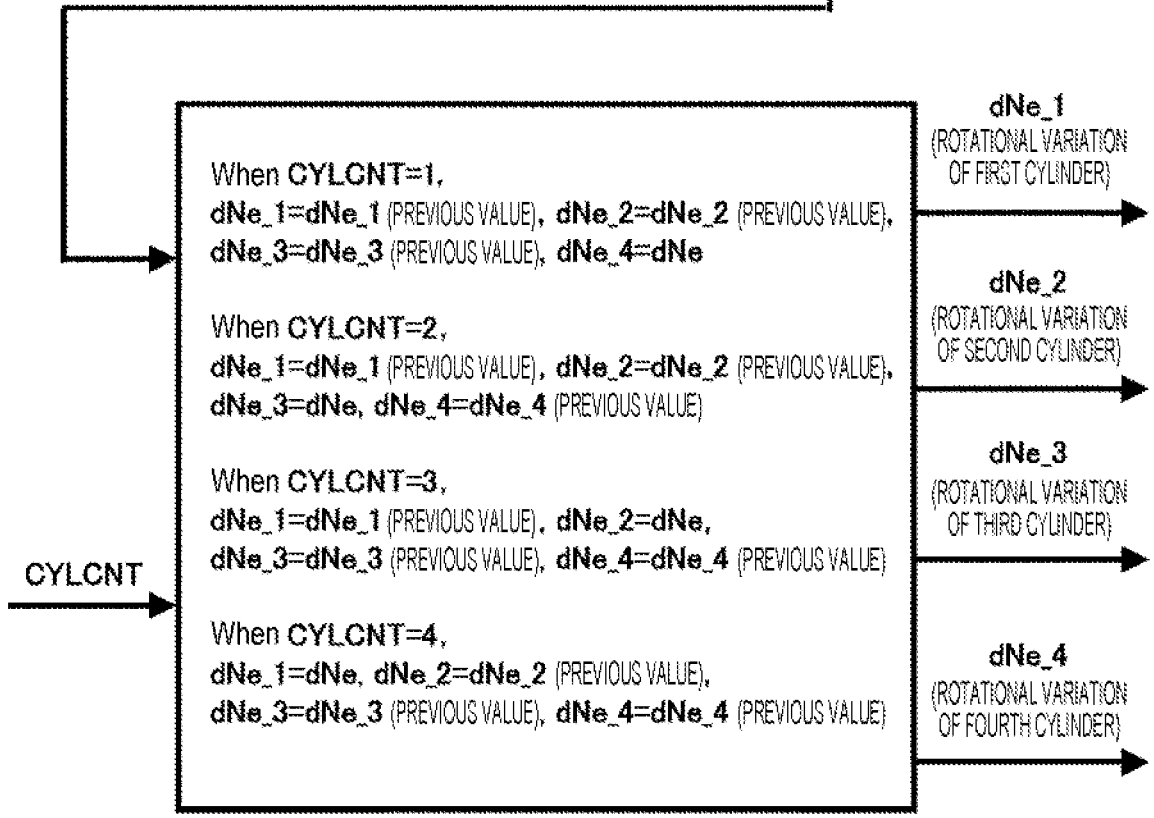
FIG. 15 is a block diagram of an individual-cylinder rotational variation calculation unit in the fourth embodiment.

In this calculation unit, the rotational variations (dNe_1, dNe_2, dNe_3, and dNe_4) of the respective cylinder are calculated. The details are illustrated in FIG. 15. When an external EGR amount is equal to or more than a predetermined amount, this process is performed.

A difference between the current value and the previous value of Ne (rotation speed) is calculated, and set to dNe (rotational variation).

When CYLCNT=1,
  dNe_1=dNe_1 (previous value), dNe_2=dNe_2 (previous value)
  dNe_3=dNe_3 (previous value), dNe_4=dNe When CYLCNT=2,
  dNe_1=dNe_1 (previous value), dNe_2=dNe_2 (previous value)
  dNe_3=dNe, dNe_4=dNe_4 (previous value)

When CYLCNT=3,
  dNe_1=dNe_1 (previous value), dNe_2=dNe
  dNe_3=dNe_3 (previous value), dNe_4=dNe_4 (previous value)

When CYLCNT=4,
  dNe_1=dNe, dNe_2=dNe_2 (previous value)
  dNe_3=dNe_3 (previous value), dNe_4=dNe_4 (previous value)

Herein,
  dNe_1: Rotational variation of the first cylinder
  dNe_2: Rotational variation of the second cylinder
  dNe_3: Rotational variation of the third cylinder
  dNe_4: Rotational variation of the fourth cylinder <Unstable Cylinder Detection Unit (FIG. 16)>

Figure 16:
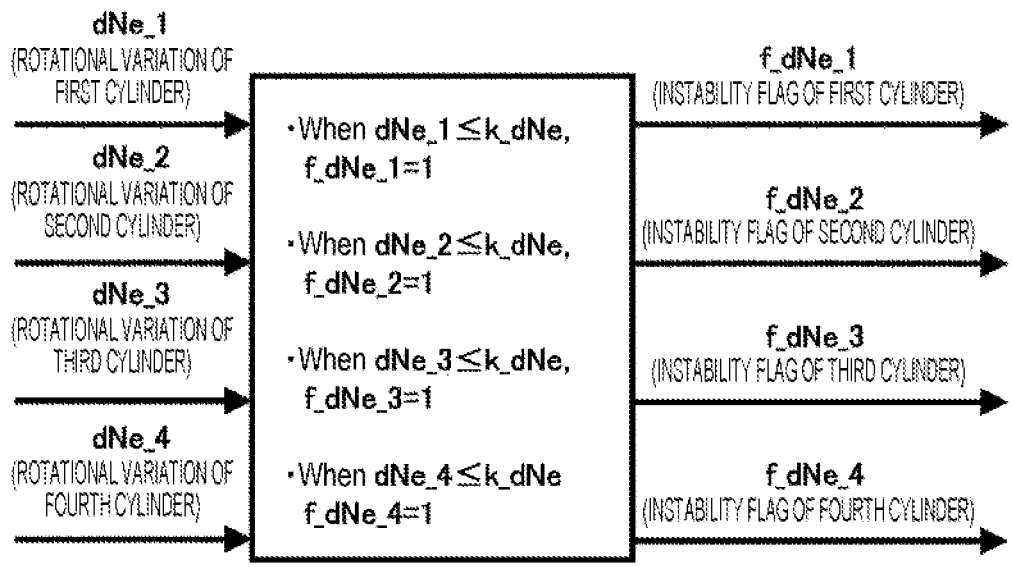
FIG. 16 is a block diagram of an unstable cylinder detection unit in the fourth embodiment.

In this calculation unit, the cylinders f_dNe_1 to f_dNe_4 (instability flags of the first to fourth cylinders) of which the stability is degraded due to the excessive EGR amount are detected using dNe_1, dNe_2, dNe_3, and dNe_4. The details are illustrated in FIG. 16. When an external EGR amount is equal to or more than a predetermined amount, this process is performed.

The cylinders are initialized to f_dNe_1=0, f_dNe_2=0, f_dNe_3=0, and f_dNe_4=0.
When dNe_1 k dNe, f_dNe_1=1
When dNe_2 k dNe, f_dNe_2=1
When dNe_3 k dNe, f_dNe_3=1
When dNe_4 k dNe, f_dNe_4=1

<Excessive-EGR Cylinder Detection Unit (FIG. 17)>

Figure 17:
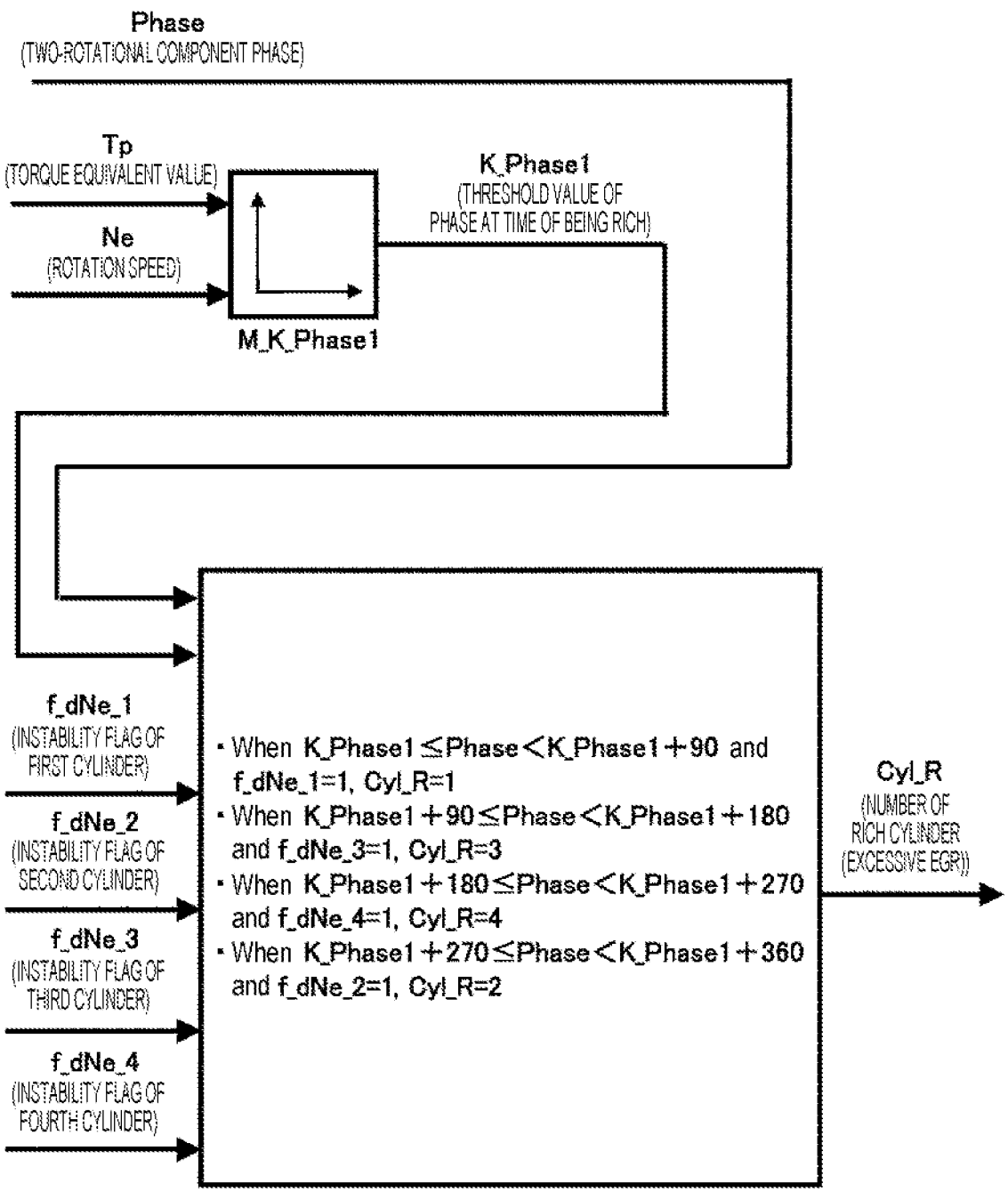
FIG. 17 is a block diagram of an excessive-EGR cylinder detection unit in the fourth embodiment.

In this calculation unit, Cyl_R (the number of the cylinder having the excessive EGR amount) is calculated using Phase and f_dNe_1 to f_dNe_4. The details are illustrated in FIG. 17. When an external EGR amount is equal to or more than a predetermined amount, this process is performed.

A value obtained with reference to a map M_K_Phase1 using TP (torque equivalent value) and Ne (rotation speed) is set to K_Phase1 (threshold value of the phase at the time of being rich).

When K_Phase1≤Phase<K_Phase1+90 and f_dNe_1=1, Cyl_R=1
When K_Phase1+90≤Phase<K_Phase1+180 and f_dNe_3=1, Cyl_R=3
When K_Phase1+180≤Phase<K_Phase1+270 and f_dNe_4=1, Cyl_R=4
When K_Phase1+270≤Phase<K_Phase1+360 and f_dNe_2=1, Cyl_R=2

The map M_K_Phase1 is determined according to the engine specification, a position where the air-fuel ratio sensor is attached, and characteristics. The map may be determined from a prototype test.

<Ignition Timing Calculation Unit (FIG. 5)>

In this calculation unit, Adv1 to Adv4 (ignition timings of the first to fourth cylinders) are calculated. While being illustrated in FIG. 5, the details are the same as those of the first embodiment, and thus will not be described.

Fifth Embodiment

In this embodiment, the description will be given about an example in which a cylinder having the richest air-fuel ratio is detected using an air-fuel ratio sensor of an exhaust manifold integrated part at the time of executing the external EGR, the ignition timing of the subject cylinder is advanced, and the ignition timings of the other cylinders are lagged.

FIG. 1 is a system diagram illustrating this embodiment. The other configurations are the same as those of the first embodiment (FIG. 1), and thus the details will not be described.

FIG. 2 is a diagram illustrating the inner configuration of the control unit 16 which is the same as that of the first embodiment (FIG. 2), and thus the details will not be described.

Hereinafter, the description will be given about the control program written in the ROM 22. FIG. 3 is a block diagram illustrating the entire control, which is configured by the following calculation units.

Rich cylinder detection unit (FIG. 4)
Ignition timing calculation unit (FIG. 5)

The "rich cylinder detection unit" calculates the number (Cyl_R) of a cylinder of which the air-fuel ratio is richest. The "ignition timing calculation unit" calculates the ignition timings (Adv1 to Adv4) of the first to fourth cylinders. The ignition timing of the cylinder indicated by Cyl_R is advanced by a predetermined amount. The ignition timings of the other cylinders are lagged by a predetermined amount. Hereinafter, the details of the respective calculation units will be described.

<Rich Cylinder Detection Unit (FIG. 4)>

In this calculation unit, Cyl_R (the number of rich cylinder (excessive EGR)) is calculated. While being illustrated in FIG. 4, the details are the same as those of the first embodiment, and thus will not be described.

<Ignition Timing Calculation Unit (FIG. 18)>

Figure 18:
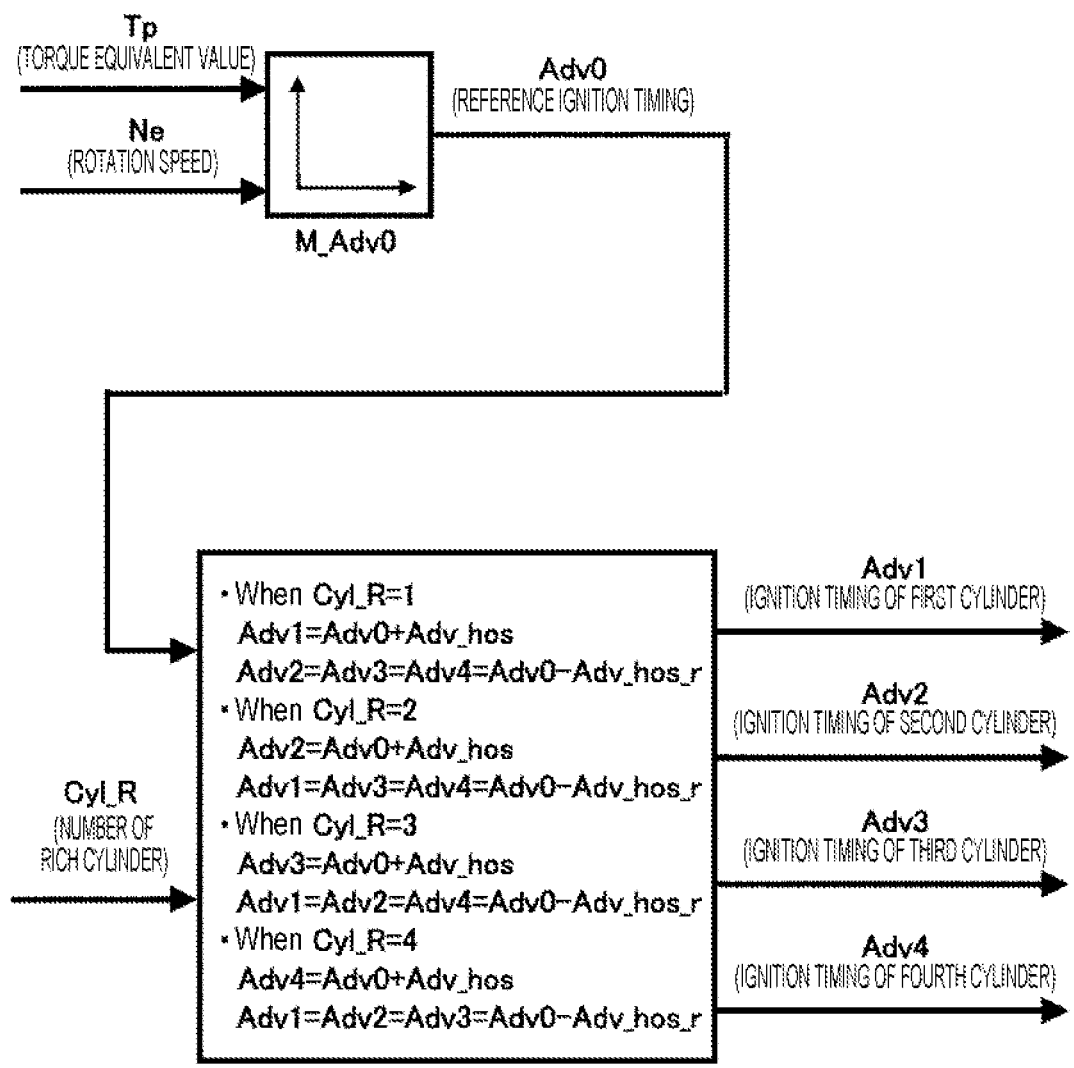
FIG. 18 is a block diagram of an ignition timing calculation unit in the fifth embodiment.

In this calculation unit, Adv1 to Adv4 (ignition timings of the first to fourth cylinders) are calculated. The details are illustrated in FIG. 18.

A value obtained with reference to a map M_Adv0 using TP (torque equivalent value) and Ne (rotation speed) is set to Adv0 (reference ignition timing).

When Cyl_R=1
  Adv1=Adv0+Adv_hos
  Adv2=Adv3=Adv4=Adv0−Adv_hos_r
When Cyl_R=2
  Adv2=Adv0+Adv_hos
  Adv1=Adv3=Adv4=Adv0−Adv_hos_r
When Cyl_R=3
  Adv3=Adv0+Adv_hos
  Adv1=Adv2=Adv4=Adv0−Adv_hos_r
When Cyl_R=4
  Adv4=Adv0+Adv_hos
  Adv1=Adv2=Adv3=Adv0−Adv_hos_r Further, since a minimum value of Rabf (air-fuel ratio) obtained by the rich cylinder detection unit is a rich degree, Adv_hos (advance angle correction amount) and Adv_hos_r (lag angle correction amount) may be changed according to the rich degree (according to an excessive EGR amount). In addition, the fuel injection amount of the cylinder other than the cylinder having the richest air-fuel ratio may be corrected to be increased.

The effects of the configuration of the invention are as follows. An engine control device of the invention controls, for example, a spark ignition engine which includes an EGR means to recirculate an exhaust to a combustion chamber, and an air-fuel-ratio detection means to detect an air-fuel ratio of each cylinder. The engine control device includes a means which corrects the ignition timing of the rich cylinder to be advanced or increases the ignition energy of the rich cylinder when the exhaust is recirculated by the EGR means and when the air-fuel ratio varies in the respective cylinders to be a rich air-fuel ratio and to be a lean air-fuel ratio compared to a predetermined value.

Figure 19:
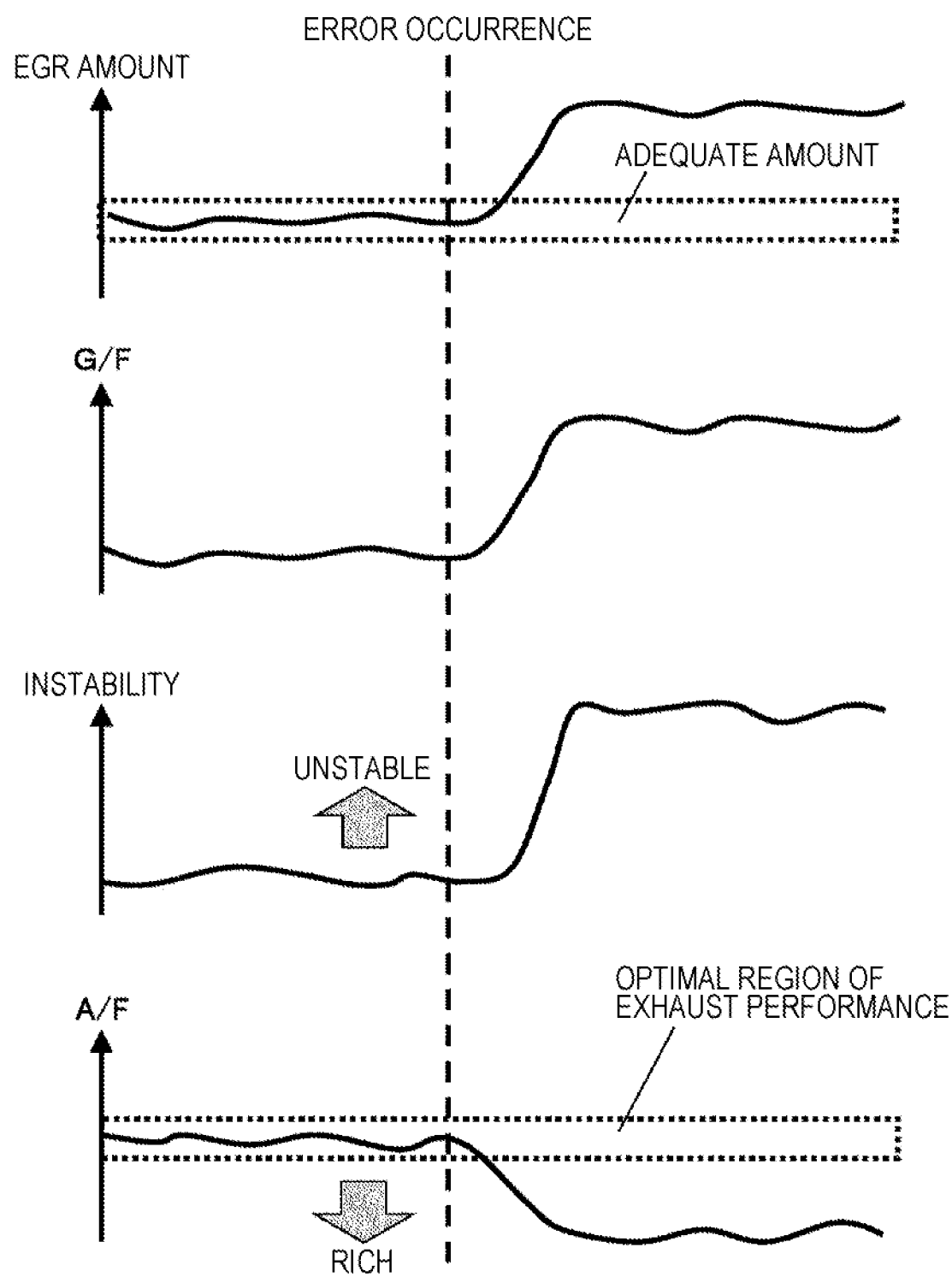
FIG. 19 is profiles of EGR amount, G/F, A/F, and instability of a specific cylinder at the time when a failure occurs in an EGR control system.

In other words, in a case where the EGR is performed to recirculate the exhaust to the combustion chamber, the EGR amount (exhaust recirculating amount) varies among the cylinders by failure and aging of the EGR control system. Herein, examples of the failure and the aging may include clogging, damage of components, and degradation. It may be considered a state where the variation in EGR amount occurs among the cylinders by an error of the EGR control system. As illustrated in FIG. 19, when a cylinder has an excessive EGR amount due to the variation in EGR amount among the cylinders, G/F (a ratio of a gas amount in the cylinder and a fuel amount) becomes large, and the stability is degraded. On the other hand, the cylinder having an excessive EGR amount has a less air amount compare to the other cylinders. The air-fuel ratio control in the related art uniformly corrects the fuel injection amounts of all the cylinders such that the air-fuel ratio of the exhaust manifold integrated part becomes a target air-fuel ratio. Therefore, a cylinder which contains a less air amount but has the excessive EGR amount becomes relatively rich compared to the other cylinders.

In a case where only the fuel injection amount of the subject cylinder is reduced, the richness of the air-fuel ratio of the subject cylinder is suppressed, but the air-fuel ratio becomes lean and thus the combustion stability is degraded still more. Since the cylinder having a rich air-fuel ratio due to the excessive EGR amount is lagged in the combustion speed, it is possible to be improved to be stable by advancing the ignition timing. In addition, since the cylinder having a rich air-fuel ratio due to the excessive EGR is lagged in the combustion speed, it is possible to be improved to be stable by increasing the ignition energy. Herein, as a method of increasing the ignition energy, a method of lengthening a spark ignition period and a method of reinforcing the current flowing to the ignition coil are considered.

In addition, in the engine control device of the invention, the EGR means is at least one of an external EGR means which recirculates the exhaust toward the intake side and an internal EGR means which controls the exhaust to be left in the combustion chamber or directly return.

In other words, the EGR means which recirculates the exhaust to the combustion chamber is at least one of the external EGR means which recirculates the exhaust toward the intake side using a recirculation pipe, and the internal EGR means which controls, for example, an opening/closing period and a lift amount of intake and exhaust valves such that the exhaust is left in the combustion chamber or directly returns.

In addition, in the engine control device of the invention, the predetermined air-fuel ratio is a target air-fuel ratio or an average air-fuel ratio of all the cylinders in the air-fuel ratio feedback control.

In other words, due to a variation of the EGR amount among the cylinders, the air-fuel ratio varies between a rich side and a lean side around the target air-fuel ratio in the air-fuel ratio feedback control or an air-fuel ratio of all the cylinders which is substantially equivalent to the target air-fuel ratio. Therefore, the rich cylinder is determined as a cylinder having an excessive EGR amount on the basis of the target air-fuel ratio in the air-fuel ratio feedback control or the average air-fuel ratio of all the cylinders.

In addition, the engine control device of the invention includes at least a means which detects a combustion stability of the rich cylinder. When the combustion stability of the rich cylinder departs from a predetermined range, the engine control device corrects the ignition timing of the rich cylinder to be advanced or increases the ignition energy of the rich cylinder.

In other words, as described above, when the cylinder having the excessive EGR amount becomes rich, the combustion stability is simultaneously degraded. At least the combustion stability of the rich cylinder is detected for each cylinder. When the richness and the combustion stability depart from a predetermined range, the subject cylinder is determined as stable due to the excessive EGR amount. Further, a combustion pressure, torque, and an angular acceleration are considered as the combustion stability.

In addition, the engine control device of the invention includes at least a means which detects an angular acceleration of the rich cylinder. When the angular acceleration of the rich cylinder is equal to or less than a predetermined value, the engine control device corrects the ignition timing of the rich cylinder to be advanced or increases the ignition energy of the rich cylinder.

In other words, as described above, when the cylinder having the excessive EGR amount becomes rich, the combustion stability is simultaneously degraded. The degradation of the combustion stability is detected by the angular acceleration of each cylinder. When the richness and the angular acceleration are equal to or less than a predetermined value, the subject cylinder is determined to have the excessive EGR amount.

In addition, the engine control device of the invention corrects the ignition timing of a cylinder other than the rich cylinder to be lagged, or corrects the fuel injection amount to be increased.

In other words, while the cylinder having the excessive EGR amount becomes rich, the cylinder having a less EGR amount is increased in the air amount in proportion to being rich so as to become lean. Since a knock limit is shifted toward a lagged angle side due to the less EGR amount, the ignition timing of the subject cylinder is lagged. Alternatively, the leaning is released by correcting the fuel injection amount to be increased.

REFERENCE SIGNS LIST 1 air cleaner
2 air flow sensor
3 electronic throttle
4 intake manifold
5 collector
6 accelerator
7 fuel injection valve
8 ignition plug
9 engine
10 exhaust manifold
11 three-way catalyst
12 air-fuel ratio sensor of upstream of catalyst
13 accelerator opening sensor
14 water temperature sensor
15 crank angle sensor
16 control unit
17 throttle opening sensor
18 exhaust recirculating pipe
19 EGR valve
20 O2 sensor of downstream of catalyst
21 CPU
22 ROM
23 RAM
24 input circuit
25 input/output port
26 ignition output circuit
27 fuel injection valve drive circuit
28 electronic throttle drive circuit
29 intake air temperature sensor
30 EGR valve drive circuit
31 intake valve
32 exhaust valve
33 intake valve drive circuit
34 exhaust valve drive circuit

The invention claimed is:

1. An engine control device that controls a spark ignition engine equipped with an EGR device to recirculate an exhaust to a combustion chamber, and detects an air-fuel ratio of each cylinder,
wherein, when an air-fuel ratio of each cylinder varies between a rich air-fuel ratio and a lean air-fuel ratio due to a variation in exhaust recirculation amount at the time when the exhaust is recirculated by the EGR device,
an ignition timing of a cylinder having the rich air-fuel ratio is corrected to be advanced, or an ignition energy of the cylinder having the rich air-fuel ratio is increased, wherein the cylinder having the rich air-fuel ratio is determined based on real and imaginary components of air-fuel ratio signals calculated from the air-fuel ratio signals received from air-fuel ratio sensors disposed in the spark ignition engine at a time of executing the EGR device;
wherein a correction amount of the ignition timing of the cylinder having the rich air-fuel ratio to be advanced or an increasing amount of the ignition energy of the cylinder having the rich air-fuel ratio is changed based on a degree of a variation in air-fuel ratio of each cylinder.

2. The engine control device according to claim 1,
wherein the EGR device is at least one of
an external EGR device that recirculates the exhaust toward an intake side through an exhaust recirculating pipe, and
an inner EGR device that controls an intake valve and an exhaust valve such that the exhaust is left in the combustion chamber or directly returns.

3. The engine control device according to claim 1,
wherein the predetermined air-fuel ratio is a target air-fuel ratio in an air-fuel ratio feedback control or an average air-fuel ratio of all the cylinders.

4. The engine control device according to claim 1,
wherein, when a combustion stability of the cylinder having the rich air-fuel ratio departs from a predetermined range,
the ignition timing of the cylinder having the rich air-fuel ratio is corrected to be advanced, or the ignition energy of the cylinder having the rich air-fuel ratio is increased.

5. The engine control device according to claim 1,
wherein, when an angular acceleration of the cylinder having the rich air-fuel ratio is equal to or less than a predetermined value,
the ignition timing of the cylinder having the rich air-fuel ratio is corrected to be advanced, or the ignition energy of the cylinder having the rich air-fuel ratio is increased.

6. The engine control device according to claim 1,
wherein the ignition timing of a cylinder other than the cylinder having the rich air-fuel ratio is corrected to be lagged, or a fuel injection amount is corrected to be increased.

7. The engine control device according to claim 1, wherein a cylinder having an excessive EGR amount is detected with the air-fuel ratio sensors and a crank angle sensor at the time of executing the EGR device.

8. The engine control device according to claim 1, wherein a phase of the air-fuel ratio signals is calculated based on the real and imaginary components of the air-fuel ratio signals.

9. The engine control device according to claim 8, wherein a number of the cylinder having the rich air-fuel ratio is determined based on the phase of the air-fuel ratio signals.

* * * * *